United States Patent
Nakamura et al.

(10) Patent No.: US 7,602,569 B2
(45) Date of Patent: Oct. 13, 2009

(54) MAGNETIC TAPE AND MAGNETIC TAPE CARTRIDGE

(75) Inventors: Akihiro Nakamura, Kyoto (JP); Masakazu Tani, Nagaokakyo (JP); Kousuke Amano, Ibaraki (JP); Shinji Arakawa, Kameoka (JP); Jyunichi Shimizu, Takatsuki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 214 days.

(21) Appl. No.: 11/450,320

(22) Filed: Jun. 12, 2006

(65) Prior Publication Data
US 2006/0227460 A1 Oct. 12, 2006

Related U.S. Application Data

(63) Continuation of application No. 10/343,435, filed as application No. PCT/JP02/02280 on Mar. 12, 2002, now Pat. No. 7,092,199.

(30) Foreign Application Priority Data
Mar. 12, 2001 (JP) ............................ P2001-069521

(51) Int. Cl.
*G11B 15/18* (2006.01)
(52) U.S. Cl. ...................... 360/71; 360/73.01; 360/134
(58) Field of Classification Search ................ None
See application file for complete search history.

(56) References Cited

U.S. PATENT DOCUMENTS

| | | | | |
|---|---|---|---|---|
| 5,535,190 | A * | 7/1996 | Moore et al. | 369/14 |
| 6,698,676 | B2 * | 3/2004 | Shiga et al. | 242/348.2 |
| 6,771,450 | B1 * | 8/2004 | Okuda et al. | 360/75 |
| 7,092,199 | B2 * | 8/2006 | Nakamura et al. | 360/77.12 |
| 2001/0024741 | A1 | 9/2001 | Ochi et al. | |
| 2003/0027018 | A1 | 2/2003 | Hayashi et al. | |
| 2006/0227460 | A1 * | 10/2006 | Nakamura et al. | 360/134 |

FOREIGN PATENT DOCUMENTS

| | | |
|---|---|---|
| CA | 2105116 A1 | 3/1994 |
| GB | 2335785 A | 9/1999 |
| JP | 3-290888 A | 12/1991 |
| JP | 9-265625 A | 10/1997 |
| JP | 11-154311 A | 6/1999 |
| JP | 11-238225 A | 8/1999 |
| JP | 11-242814 A | 9/1999 |
| JP | 11-250449 A | 9/1999 |
| JP | 2000-040217 A | 2/2000 |
| JP | 2000-40218 A | 2/2000 |
| JP | 2000-155938 A | 6/2000 |
| WO | WO-01/04879 A1 | 1/2001 |

* cited by examiner

*Primary Examiner*—Jason C Olson
(74) *Attorney, Agent, or Firm*—Birch, Stewart, Kolasch & Birch, LLP

(57) ABSTRACT

A magnetic tape which is run at a speed of 4 m/sec. or higher and has recording tracks with a width of 21 μm or less, and which includes a non-magnetic support, at least one magnetic layer formed on one surface of the non-magnetic support, and a backcoat layer formed on the other surface of the non-magnetic support, wherein servo signals for controlling tracking are recorded on the magnetic layer or the backcoat layer, the value of $(\alpha/W) \times (V/f)$ is 10 $[s^{-1}]$ or less, and/or the value of $(\alpha/W)$ is 0.1 or less, wherein V [mm/sec.] is a tape-running speed is; $\alpha$ [μm] is an amount of a weave with a cycle of f [mm] on one edge of the tape or the other edge thereof as the reference side for the running of the tape; and W [μm] is a width of the recording track. The magnetic tape can decrease PES and off-track and thus is excellent in servo tracking performance.

4 Claims, 5 Drawing Sheets

MAGNETIC TAPE AND MAGNETIC TAPE CARTRIDGE

This application is a Continuation of application Ser. No. 10/343,435, filed on Sep. 12, 2003 now U.S. Pat. No. 7,092,199 and for which priority is claimed under 35 U.S.C. § 120. Application Ser. No. 10/343,435 is the national phase of PCT International Application No. PCT/JP02/02280 filed on Mar. 12, 2002 under 35 U.S.C. § 371. The entire contents of each of the above-identified applications are hereby incorporated by reference.

TECHNICAL FIELD

The present invention relates to a magnetic tape cartridge having a large recording capacity, a high access speed and a high transfer speed. In particular, the present invention relates to a single reel type magnetic tape cartridge suitable for data-backup, containing a magnetic tape which records magnetic signals or optical signals for servo tracking, and reproduces magnetically recorded signals with reproducing heads containing magnetoresistance elements (hereinafter referred to as "MR head").

BACKGROUND ART

Magnetic tapes have found various applications in audio tapes, videotapes, computer tapes, etc. In particular, in the field of magnetic tapes for data-backup (or backup tapes), tapes having memory capacities of several tens GB or more per one reel are commercialized in association with increased capacities of hard discs for back-up. Therefore, it is inevitable to increase the capacity of this type of tape for data-backup. It is also necessary to increase the feeding speed of tape and the relative speed between the tape and heads in order to quicken the access speed and the transfer speed.

To increase the capacity of tape for data-backup per one reel, it is necessary to increase the length of tape per reel by decreasing the total thickness of the tape, to decrease the thickness demagnetization so as to shorten the recording wavelength by forming a magnetic layer with a very thin thickness of 0.3 μm or less, and to increase the recording density in the tape widthwise direction by narrowing the widths of the recording tracks to 21 μm or less, particularly 15 μm or less.

When the thickness of the magnetic layer is reduced to 0.3 μm or less, the durability of the tape tends to be reduced. Therefore, at least one primer layer is provided between a non-magnetic support and the magnetic layer. When the recording wavelength is shortened, the influence of spacing between the magnetic layer and the magnetic heads becomes serious. Thus, if the magnetic layer has large projections or dents, which leads to a decrease in output due to spacing loss, the error rate increases.

When the recording density in the tape-widthwise direction is increased by narrowing the width of the tracks to 21 μm or less, particularly 15 μm or less, magnetic flux leaking from the magnetic tape is decreased. Therefore, it is necessary to use MR heads which utilize magnetoresistance elements capable of achieving high output from very small magnetic fluxes, for reproducing heads.

Examples of the magnetic recording media used in combination with MR heads are disclosed in JP-A-11-238225, JP-A-2000-40217 and JP-A-2000-40218. In these magnetic recording media, skewness of output from the MR heads is prevented by controlling the magnetic flux from the magnetic recording medium (a product of a residual magnetic flux density and the thickness of the medium) to a specific value, or the thermal asperity of the MR heads is suppressed by reducing the dents or projections on the surface of the magnetic layer to a specific value or less.

When the width of the tracks is decreased, the reproduction output lowers due to off-track. To avoid such a problem, track servo is needed. Types of such track servos include an optical servo type and a magnetic servo type. In either of these types, the track servo is performed on a magnetic tape drawn out from a magnetic tape cartridge (which may be also called a cassette tape) of a single reel type which houses only one reel having the magnetic tape wound thereon in a box-like casing body. The reason for using a single reel type cartridge is that the tape can not be stably run in a two-reel type cartridge which has two reels for drawing out the tape and for winding the same, when the tape-running speed is increased (for example, 2.5 m/second or higher) so as to quicken the data transfer speed. The two-reel type cartridge has another problem in that the dimensions of the cartridge become larger and that the memory capacity per volume becomes smaller.

As mentioned above, there are two types of track servo systems, i.e., the magnetic servo type and the optical servo type. In the track servo type, servo bands (200) as shown in FIG. 9 are formed on a magnetic layer by magnetic recording, and servo tracking is performed by magnetically reading such servo bands. In the optical servo type, servo bands each consisting of an array of dents is formed on a backcoat layer by laser irradiation or the like, and servo tracking is performed by optically reading such servo bands. Other than these types, there is such a track servo in which magnetic servo signals are also recorded on a magnetized backcoat layer in the magnetic serve type. Further, as other optical servo types, there is one which can record optical servo signals on a backcoat layer which is formed of a material capable of absorbing light or the like.

Then, the principle of the track servo system is simply described by way of the former magnetic servo type.

As shown in FIG. 9, in the magnetic tape (3) for the magnetic servo type, servo bands (200) for track serve which extend along the lengthwise direction of the tape, and data tracks (300) for recording data thereon are formed on the magnetic layer. Each servo band (200) consists of a plurality of servo signal-recording sections (201) on which the respective servo track numbers are magnetically recorded. A magnetic head array (not shown) which records and reproduces data on and from a magnetic tape consists of a pair of MR heads for servo track (forward running and backward running), and for example, 8×2 pairs of recording-reproducing heads (in which the recording heads are magnetic induction type heads and the reproducing heads are MR heads). In response to a signal from a MR head for servo track which has a read servo signal, the entire magnetic head array moves interlocking therewith, so that the recording-reproducing head moves in the widthwise direction of the tape to reach the data track (for example, eight data tracks are provided corresponding one serve track in a magnetic head array on which 8×2 pairs of recording-reproducing heads are mounted).

In this stage, the magnetic tape runs in such a state that one of the tape edges extending along the lengthwise direction is regulated in its tape widthwise position by the inner surface of a flange of a guide roller provided on a magnetic recording-reproducing unit (a tape-driving unit) (see FIG. 7). As seen in FIG. 3, the edge (3a) of the magnetic tape (3) generally has a corrugated unevenness called edge weave or edge wave. Therefore, the magnetic tape (3), even though running alongside the inner surface of the flange as the reference for the tape running, very slightly fluctuates in the position in the widthwise direction. However, this problem is solved by employing the above servo system: that is, even if the position of the magnetic tape very slightly fluctuates in the widthwise direction, the entire magnetic head array moves in the tape widthwise direction in association with such a fluctuation, so that the recording-reproducing head can always reach a correct data track. In a system for recording tracks with widths of 24 μm or more, the off-track margins are increased by widening the width of the recording track in comparison with the width of the reproducing track [for example, (the width of the recording track: about 28 μm, and the width of the reproducing track: about 12 μm) or (the width of the recording track: about 24 μm, and the width of the reproducing track: about 12 μm)]. In such a case, there arises little decrease in the reproducing output due to off-track, even when about 3 μm of fluctuation (edge weave) in the position of the magnetic tape occurs.

However, when the width W of the record track is reduced to 21 μm or less, a decrease in output of reproduction due to off-track appears in spite of about 3 μm of edge weave which raised no problem in the conventional record tracks. This is because, when the reproduction track width is equal to the conventional one in order to ensure a reproduction output, the off-track margin becomes narrower. Further, when the recording track width is as narrow as 21 μm or less, it is confirmed that not only the absolute value of edge weave but also the cycle of the edge weave and the tape running speed have a complicated relationship with respect to the off-track. To apply the servo system to a magnetic tape having record tracks with a width as narrow as 21 μm or less, a relationship among the cycle f and the amount a of edge weave, the record track width W, the tape running speed V, and the head followability is carefully examined. As a result, the following are revealed: a positioning error signal (or PES, i.e. a value indicating non-uniformity in positional dislocation, or the value of a standard deviation σ) becomes larger, if the values of α/W and (α/W)×(V/f) exceed specific values, wherein α is an amount of the edge weave (in the tape widthwise direction of the tape edge (the direction Y-Y' on FIG. 3)) with a cycle of f; V [mm/second] is a tape running speed; and W [μm] is a width of the record track. As a result, a tracking error is induced. This phenomenon raises a new problem when the width of the record track is set at 21 μm or less.

This is described below. Since the magnetic head array as a whole has large mass, the magnetic head array can not move following the motion of the magnetic tape in the widthwise direction, when the values of (α/W) and/or (α/W)×(V/f) exceed specific values, wherein α is an amount of the edge weave with a cycle of f on an edge of the tape (not only one edge (3a) of the tape as shown in FIG. 3, but also both edges (3a, 3a') of the tape as described below) regulated in its position while the tape is running; W is a width of the record track; and V is a tape-running speed. As a result, a positioning error signal or PES becomes larger. When the off-track margin is small, it is presumed that the off-track becomes larger. This phenomenon is not so serious when the width of the record track is 24 μm or more. Why this is not so serious is that, if the motion of the magnetic head array is slow and the PES is large, the width of the record track is sufficiently larger than the width of the reproducing track, so that the off-track margin is large: for example, about 6 μm or more of off-track margin is formed on each side, when the width of the record track is about 28 μm, and the width of the reproducing track is about 12 μm, or when the width of the record track is about 24 μm, and the width of the reproducing track is about 12 μm. Therefore, a decrease in the output of reproduction due to off-track seldom occurs.

As mentioned above, in the magnetic recording-reproducing unit (i.e., the tape-driving unit), the width of the groove of the guide roller (the distance between the inner surfaces of a pair of flanges provided on the both edges of a guide roller, see FIG. 7) is set at a dimension several ten micrometers larger than the width of the magnetic tape. Therefore, the cycle f and the amount α of the edge weave as the reference side for running are dominant over the linearity of a serve signal. On the other hand, in a unit for recording serve signals (a serve writer), the width of the groove of the guide roller is set at a dimension substantially equal to the width of the magnetic tape so that there is little clearance. Therefore, both tape edges (3a, 3a) of the tape serve as the reference sides for tape running, and thus, the cycle f and the amount α of the edge weaves of both tape edges (3a, 3a) are dominant over the linearity of the servo signal. Therefore, to decrease the off-track by decreasing PES, the relationship among the cycle f and the amount α of the edge weaves of both tape edges (3a, 3a), the width W of the record track, and the tape-running speed V should satisfy the above equation.

When the width of the record track is as narrow as 21 μm and the level of PES becomes larger, an off-track error occurs, so that a normal servo control can not be preformed. Such a problem commonly arises in both of the magnetic servo type and the optical servo type, and it is more remarkable in the optical servo type, because the mass of the entire magnetic head array used in the optical servo type is larger than that used in the magnetic servo type.

DISCLOSURE OF THE INVENTION

The present invention is to overcome the foregoing problems, and a primary object of the present invention is to provide a magnetic tape, a PES from which is low and which hardly causes an off-track even when the width of a record track is as narrow as 21 μm or less, and a magnetic tape cartridge comprising the same.

As a result of the present inventors' intensive researches in order to achieve the above object, they have found out that the level of PES becomes lower, and that an off-track hardly occurs even when the width of a record track is as narrow as 21 μm or less, if the values of α/W and (α/W)×(V/f) are smaller than specific values, wherein V is a tape-running speed; α is an amount of edge weave with a cycle of f on one tape edge 3a or the opposite tape edge 3a' served as a reference side for the running of the tape; and W is a width of the record track. Thus, the present invention is accomplished based on such findings.

Accordingly, the present invention provides a magnetic tape and a magnetic tape cartridge as described below.

A magnetic tape according to the present invention is used at a running speed of 4 m/sec., and it comprises a non-magnetic support, at least one magnetic layer formed on one surface of the non-magnetic support, and a backcoat layer formed on the other surface thereof, wherein servo signals for use in the control of tracking are recorded on the magnetic layer or the backcoat layer, and the width of record tracks is 21 μm or less. The magnetic tape is characterized in that the value of (α/W)×(V/f) is not larger than $10[s^{-1}]$, and/or the value of α/W is not larger than 0.1, wherein α [μm] is an amount of edge weave with a cycle of f [mm] on one tape edge 3a or the opposite tape edge 3a' served as a reference side for the running of the tape; V is a tape-running speed; and W [μm] is a width of the record track as shown in FIG. 3.

A magnetic tape cartridge according to the present invention comprises a box-shaped casing body (1), and one reel (2) around which a magnetic tape (3) according to the present invention is wound, arranged in the casing body (1), and tracking control is done by servo signals recorded on the magnetic tape (3), while the position of one edge of the tape serving as a reference side for the tape running is being regulated in the widthwise outward direction.

As shown in FIGS. 2 and 8, in the one-reel type magnetic tape cartridge according to the present invention, the outer circumferential wall of the winding shaft (23) of the reel (2) is tapered so that the winding shaft (23) has a larger diameter on the side of one of the edges of the tape which serves as a reference side for the running of the tape (on the side of the upper end surface of the winding shaft (23) as seen in FIGS. 2 and 8). The distance between the inner surfaces of the flange portions (21 and 22) which oppose to each other at a position just outside the winding shaft (23) and on the inner circumference of the reel (the reel flanges having large diameters arranged adjacent to both end faces of the winding shaft (23)) is assumed as S1, and the distance between the inner surfaces of the flange portions (21 and 22) which oppose to each other at a position on the outer circumference of the reel therein is assumed as S2. Under the above assumptions, the ratio of S1 to the upper limit P of the width of the tape (S1/P) is restricted within a specified range, and the ratio of the space S2 to the upper limit P is restricted within a specified range. By doing so, the level of PES becomes lower, so that off-track hardly occurs, and that the damage of the edge of the tape and winding disorder of the tape are hardly caused. In this regard, the inner circumferential portion of the reel means a portion of the reel on which the first turn of the wound magnetic tape, that is, the innermost part of the magnetic tape is located in the wound tape in a predetermined state, and the outer circumferential portion of the reel means the outermost circumferential portion of the reel.

In particular, the reel (2) comprises the winding shaft (23) at the center, and a pair of the flange portions (21 and 22) having larger diameters, located on both end faces of the winding shaft. As shown in FIG. 8, the outer circumferential surface of the winding shaft (23) is tapered at an angle of 0.01 to 0.1 degrees, so that the diameter of one end face (23$a$) of the winding shaft (23) located on the side of one edge of the tape which serves as the reference side for the running of the tape can be larger than the diameter of the other end face (23$b$) thereof. In addition, the ratio of the above distance S1 between the inner surfaces of the flange portions (21 and 23), to the upper limit P of the width of the tape (S1/P) is set within a range of $1.010 \leq (S1/P) \leq 1.022$, while the ratio of the above distance S2 between the inner surfaces of the flange portions (21 and 23), to the upper limit P of the width of the tape (S2/P) is set within a range of $(S1/P)<(S2/P)<1.041$. The above arrangement is to improve the tracking servo control: that is, by the above arrangement, one edge (3$a$) of the tape can be surely fitted along the inner face of the flange (71) of the guide roller (70) (the face serving as the reference for the running of the tape) while the tape is running, and thereby, the slight widthwise vibration of the magnetic tape (3) is suppressed or prevented as much as possible so that the tracking servo control can be precisely performed (see FIG. 7). The ratio of (S1/P) is set preferably within a range of $1.013 \leq (S1/P) \leq 1.020$, more preferably within a range of $1.016 \leq (S1/P) \leq 1.018$. If the ratio of (S1/P) is less than 1.010, the edge of the tape is rubbed on the guide or the like and thus easily damaged, while, if it is more than 1.022, a winding disorder of the tape tends to occur. The ratio of (S2/P) is set preferably within a range of 1.01 (S1/P) to 1.03 (S1/P), more preferably within a range of 1.015 (S1/P) to 1.025 (S1/P). If the ratio of (S2/P) is less than or equal to (S1/P), the edge of the magnetic tape is rubbed on the flange of the reel during the tape-winding operation or the tape-drawing operation and thus is subject to damage. This phenomenon is remarkable when the height of the winding shaft of the reel slightly differs from the height of the groove of the guide roller. On the other hand, when the ratio of (S2/P) is 1.041 or more, a winding disorder of the tape may occur. As mentioned above, the magnetic tape cartridge for which the taper angle β and the ratios (S1/P) and (S2/P) are set within the above ranges has excellent off-track preventive performance. Further, it is desirable that the curvature of the magnetic tape should be 2 mm or less per 1 meter length of the tape in order to prevent the damage of the edge of the magnetic tape and the winding disorder of the magnetic tape.

In the above arrangement, either of the magnetic servo type and the optical servo type may be employed as the track servo control system. As has already been described, in the former type, servo tracking is performed by magnetically reading servo bands formed on a magnetic layer by magnetic recording. On the other hand, in the latter type, servo tracking is performed by optically reading servo bands composed of an array of dents formed on a backcoat layer by laser irradiation or the like. In addition to these types, other types can be employed: for example, in a magnetic servo control system, such a magnetic tape is used that comprises a magnetic backcoat layer on which magnetic servo signals are recorded, or otherwise, in an optical servo control system, such a magnetic tape is used that comprises a backcoat layer formed of a material capable of absorbing light so as to record optical serve signals.

To achieve the high density recording, the magnetic tape cartridge of the present invention is preferably arranged such that magnetically recorded signals on the magnetic tape are reproduced with reproducing heads which utilize magnetoresistance elements (MR heads). Further, in case of the magnetic servo control system, it is preferable that servo signals are also reproduced by MR heads.

BEST EMBODIMENTS FOR CARRYING OUT THE INVENTION

Figure 1:
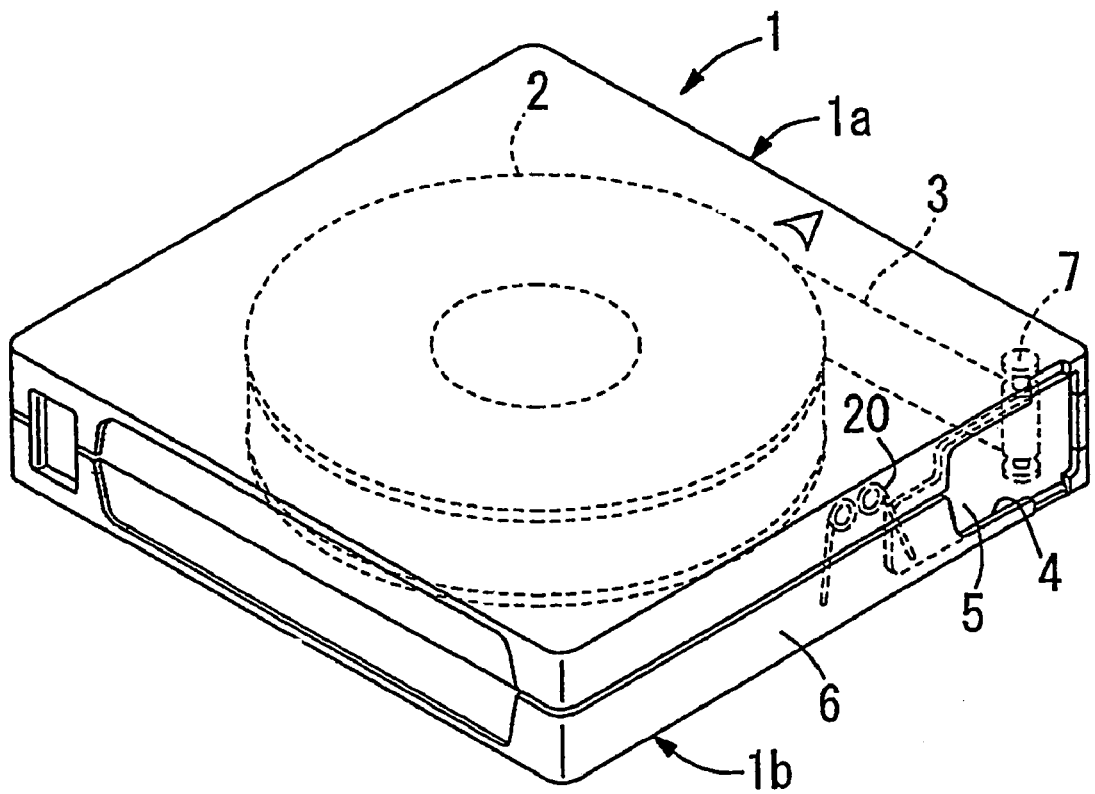
FIG. 1 is a perspective view of a magnetic tape cartridge according to the present invention, showing a general structure thereof.
Figure 2:
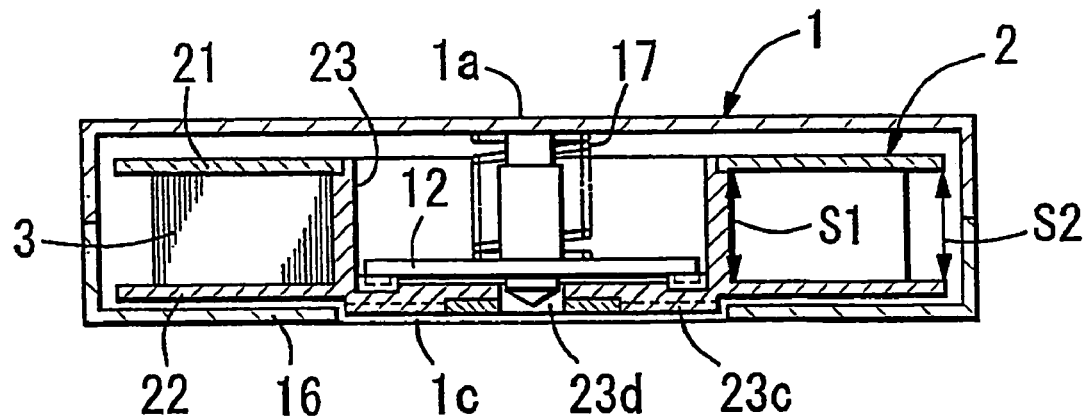
FIG. 2 is a sectional view of the magnetic tape cartridge according to the present invention, showing a partly simplified internal structure thereof.

FIG. 1 illustrates a structure of a magnetic tape cartridge according to the present invention, and FIG. 2 shows the internal structure thereof. As seen in FIG. 1, the magnetic tape cartridge comprises a box-shaped casing body (1) obtained by bonding the upper and lower casings (1a and 1b) to each other, one reel (2) arranged inside the casing body (1), and a magnetic tape (3) wound around the reel (2). A tape-drawing port (4) is opened on one side of the front wall (6) of the casing body (1), and the port (4) is opened or closed by a slidable door (5). A tape-drawing member (7) is combined to the end portion at which the magnetic tape (3) is drawn out in order to draw out the magnetic tape (3) wound around the reel (2) from the casing. Numeral 20 in FIG. 1 refers to a door spring for forcing the door (5) to move to a closing position.

As shown in FIG. 2, the reel (2) comprises an upper flange portion (21), a lower flange portion (22), and a winding shaft (23) which is formed integrally with the lower flange portion (22) and which is formed in the shape of a bottomed cylindrical body opened at the upper portion. The bottom wall (23c) of the winding shaft (23) is located on the inlet (1c) of the bottom wall of the casing through which a driving shaft is inserted into the casing. Gear teeth are formed on the outer periphery of the bottom wall (23c) of the winding shaft (23), and such gear teeth are to engage with a member of a tape-driving unit (a magnetically recording-reproducing unit). A bottom hole (23d) is provided at the center of the bottom wall (23c) of the winding shaft (23), and this hole (23d) is to allow an unlocking pin (not shown) of the tape-driving unit to enter the casing. Further, a reel-locking mechanism for preventing unnecessary rotation of the reel (2) is provided in the casing body (1). Numeral 12 in FIG. 2 refers to a braking button composing this reel-locking mechanism, and numeral 17 refers to a spring for forcing the braking button (12) downwardly in the drawing.

Figure 3:
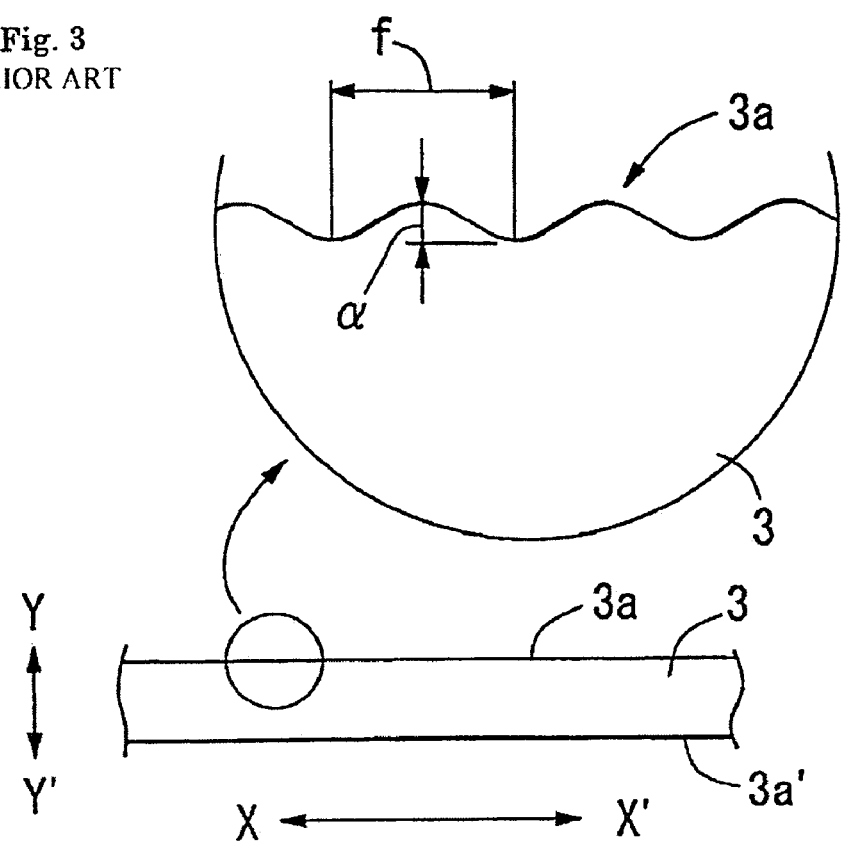
FIG. 3 is a plan view of the magnetic tape, illustrating the edge weave in an enlarged state.

In the present invention, a magnetic tape (3), which has recording tracks with a width of 21 μm or less and which is run at a rate of 4 m/sec. or more, is used in the magnetic tape cartridge shown in FIGS. 1 and 2. As shown in FIG. 3, one of the edges (3a) of the magnetic tape (3) which serves as a reference side for the running of the tape has an edge weave with a cycle of f [mm]. The value of $(\alpha/W) \times (V/f)$ is set at 10 $[s^{-1}]$ or less, and/or the value of $\alpha/W$ is at 0.1 or less, wherein $\alpha$ [μm] is an amount of the edge weave with the cycle of f; W [μm] is a width of the recording track; and V [mm/sec.] is a running speed of the tape. Herein, X-X' in FIG. 3 indicates the running direction of the magnetic tape (3).

When the relationship among the cycle f and the amount a of the edge weave, the width W of the recording track and the tape-running speed V is established as above, PES becomes smaller to 0.40 μm or less, and thus excellent servo track performance in which the off-track amount is 12% or less (preferably 6% or less, more preferably 5% or less) is achieved. The value of $\alpha/W$ is preferably 0.07 or less, more preferably 0.065, far more preferably 0.05 or less, and 0 at the best. When the value of $\alpha/W$ is 0.1 or less, PES is small and thus, a decrease in reproduction output due to off-track is small. The value of $(\alpha/W) \times (V/f)$ is preferably 4.4 $[s^{-1}]$ or less, more preferably 4 $[s^{-1}]$ or less, and 0 at the best. When the value of $(\alpha/W) \times (V/f)$ is 10 $[s^{-1}]$ or less, PES is small even if the tape-feeding speed is increased, and thus, a decrease in the reproduction output due to off-track is small. Particularly when the amount a of the edge weave with the cycle of f is set at the above value, far excellent serve track performance is obtained even when the tape-running speed is as fast as 4 m/sec., and also when the width of the recording track is as narrow as 21 μm or less.

Both of tape edges (3a and 3a') serve as reference sides for tape-running inside a unit for recording servo signals (a servo writer, not shown). Therefore, it is necessary to set the amounts of edge weaves of both tape edges (3a and 3a') at the above value in order to record excellent servo signals.

Figure 4:
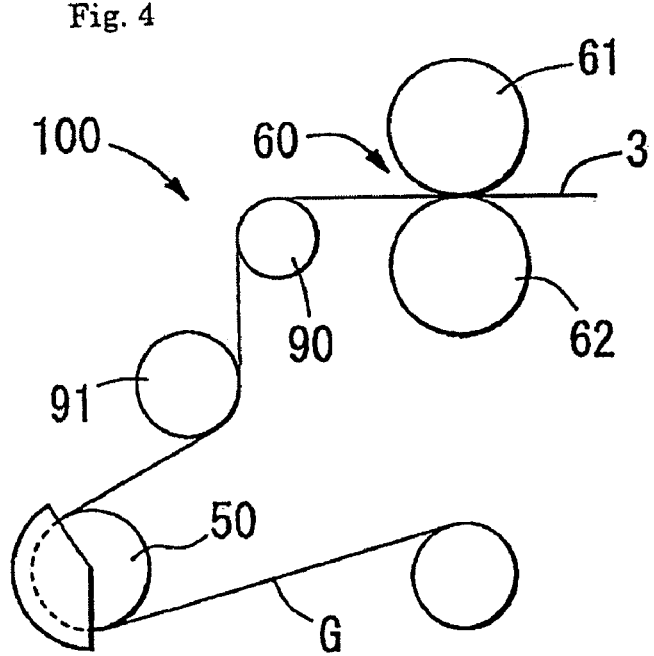
FIG. 4 illustrates a partly simplified slitting system used for slitting a magnetic sheet in the Examples of the present invention.

The reason why the edge of a tape has a weave with a short cycle (e.g., 50 mm or less) in an amount within which off-track may occur even when the tape-feeding speed is about 4 m/sec. was investigated. As a result, it is found out that the reason therefor is a short cycle fluctuation of tension, which is caused by the motion of a magnetic sheet which is being slit to provide magnetic tapes. Based on this result, the present inventors have improved the respective elements which constitute a slitting system (a system for slitting a magnetic sheet into a plurality of magnetic tapes with predetermined widths). More precisely, the tension cut roller (50) and the timing belt coupling (not shown) for transmitting power to the cutter-driving section (60) arranged in such a slitting system (100) as shown in FIG. 4 are improved, and also the mechanical vibration of the cutter-driving section (60) is suppressed. As a result, a magnetic tape obtained by the above slitting has 2 μm or less of a weave with a shorter cycle f (50 mm or less) at an edge of the tape. Among the above improvement, the improvement of the tension cut roller (50) used for controlling the tension of the magnetic sheet G is the most effective means for suppressing the widthwise fluctuation of the tape which would be caused by the edge weave with a short cycle.

Next, the reason why the edge of a magnetic tape has a weave with a relatively long cycle (e.g., 60 to 70 mm) in an amount within which off-track is induced at a tape-feeding speed of about 6 m/sec. is investigated. The cutter-driving section (60) shown in FIG. 4 has upper and lower cutters (61 and 62) which are driven to rotate in the opposite directions to each other. These cutters are connected with a driving motor (not shown) through separately provided power-transmitting devices, and are driven to rotate by this driving motor. In this case, the power-transmitting device for transmitting the power from the driving motor to the cutter-driving section (60) is composed of a flat belt in combination with a rubber coupling. Then, a magnetic tape obtained by slitting in such a system has a tape edge having a decreased amount of edge weave with a relatively long cycle, although the cycle of the widthwise positional fluctuation of the tape does not change. This effect is superior in this case, as compared with cases of using other power-transmitting devices which are composed of a timing belt in combination with a rubber coupling, a flat belt in combination with a metal coupling, and a timing belt in combination with a metal coupling, respectively. Further, a method of decreasing the amount of edge weave with a relatively long cycle has been researched. As a result, it is found out that the amount of edge weave can be extremely decreased by directly driving the cutter-driving section (60) with the motor, without using any power-transmitting device. In FIG. 4, numerals 90 and 91 refer to guides arranged along the feeding route of the magnetic sheet G.

Further, a method of prolonging the cycle of edge weave to, for example, 80 mm or more within which off-track is not induced even at a tape-feeding speed as fast as 8 m/sec. or more has been researched. As a result, it is found out that, by increasing the slitting speed, the cycle f becomes longer in correspondence with the ratio of the slitting speed, although the amount of edge weave is hardly changed.

By decreasing the sucking force of the tension cut roller from a conventional pressure of $1.33 \times 10^4$ Pa (100 mmHg) to a lower limit of $1.33 \times 10^3$ Pa (10 mmHg) which is the lowest pressure for enabling the tension cut, the tape widthwise fluctuation of a tape caused by the edge weave with a short cycle can be substantially eliminated. This method, however, has a problem in that the stable production of tapes is impaired.

Figure 5:
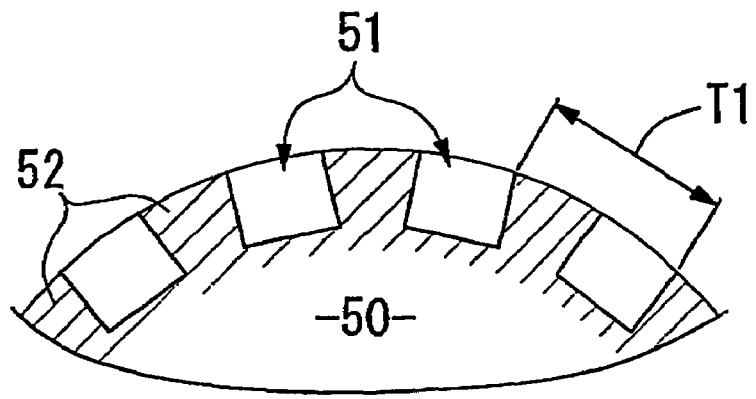
FIG. 5 is a partial sectional view of a tension cut roller arranged in the slitting system, schematically illustrating a part of sucking portions.

As shown in FIG. 5, the tension cut roller (50) used in the above slitting system has sucking portions (51) which are arranged at regular intervals along the outer circumference thereof. In the conventional system, these portions are composed of a plurality of holes which are arranged at regular intervals along the axial direction of the roller (50) (a direction perpendicular to the paper plane of FIG. 5). Therefore, the magnetic sheet relatively largely flutters when the magnetic sheet is repeatedly sucked and released. As a result, the widthwise displacement of a tape (edge weave amount α) found when the cycle of edge weave is shorter in correspondence with the cycle T1 shown in FIG. 5 becomes relatively large. To obtain a magnetic tape of the present invention having the foregoing edge structure, a tension cut roller in which the above sucking portions (51) are replaced with mesh sucking portions formed of a mesh or a porous material is used. By doing so, the amount α of edge weave with a shorter cycle corresponding to the cycle T1 shown in FIG. 5 can be decreased as compared with conventional ones, even when the sucking force from the tension cut roller (50) is set at $1.33 \times 10^4$ Pa (100 mmHg) and when the slitting speed is increased. In other words, a magnetic tape having a tape edge structure specified in the present invention [a magnetic tape in which the value of $(\alpha/W) \times (V/f)$ and/or the value of $\alpha/W$ is small] can be produced.

Figure 6:
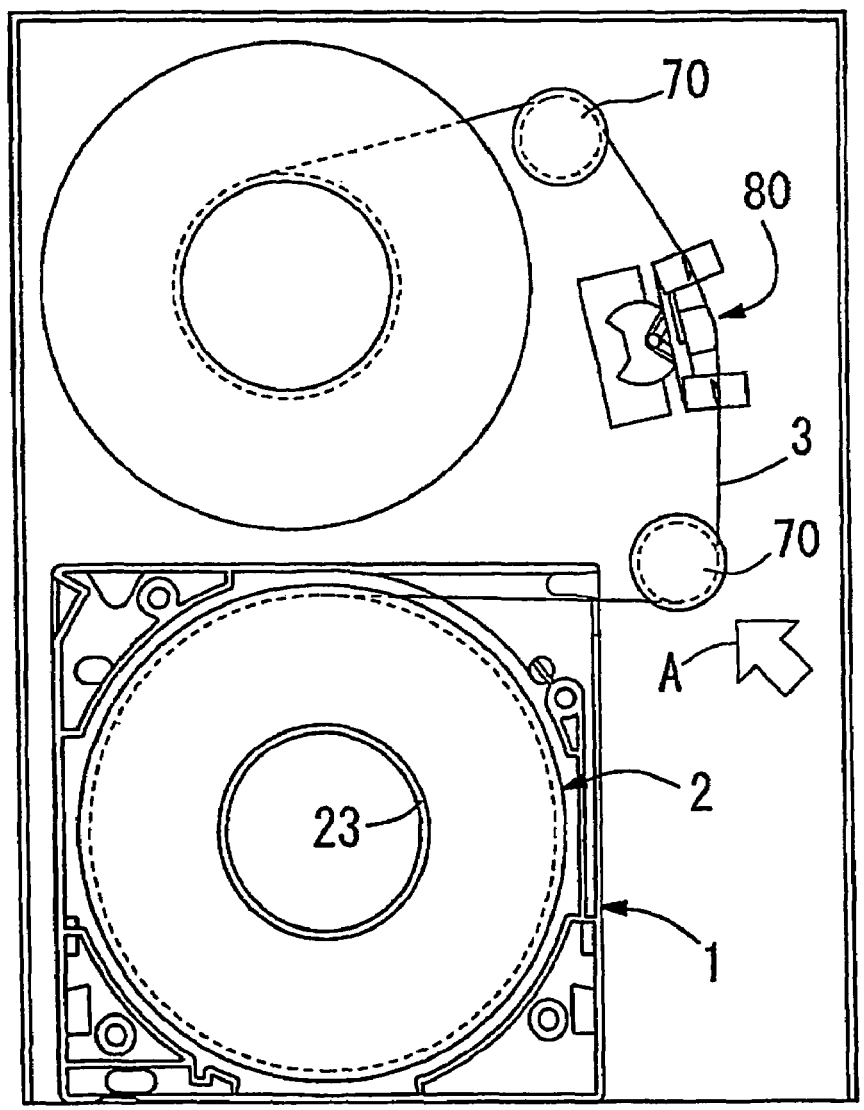
FIG. 6 is a plan view of a magnetically recording-reproducing unit (a tape-driving unit), used in combination with a magnetic tape cartridge.

In the meantime, a magnetically recording-reproducing unit (a tape-driving unit) which records or reproduces data using such a magnetic tape is provided with guide rollers (70) as shown in FIG. 6, so as to run the magnetic tape (3), drawn out of the casing body (1) of the magnetic tape cartridge, along a predetermined route. In this drawing, a head member (80) is arranged between a pair of guide rollers (70, 70).

Figure 7:
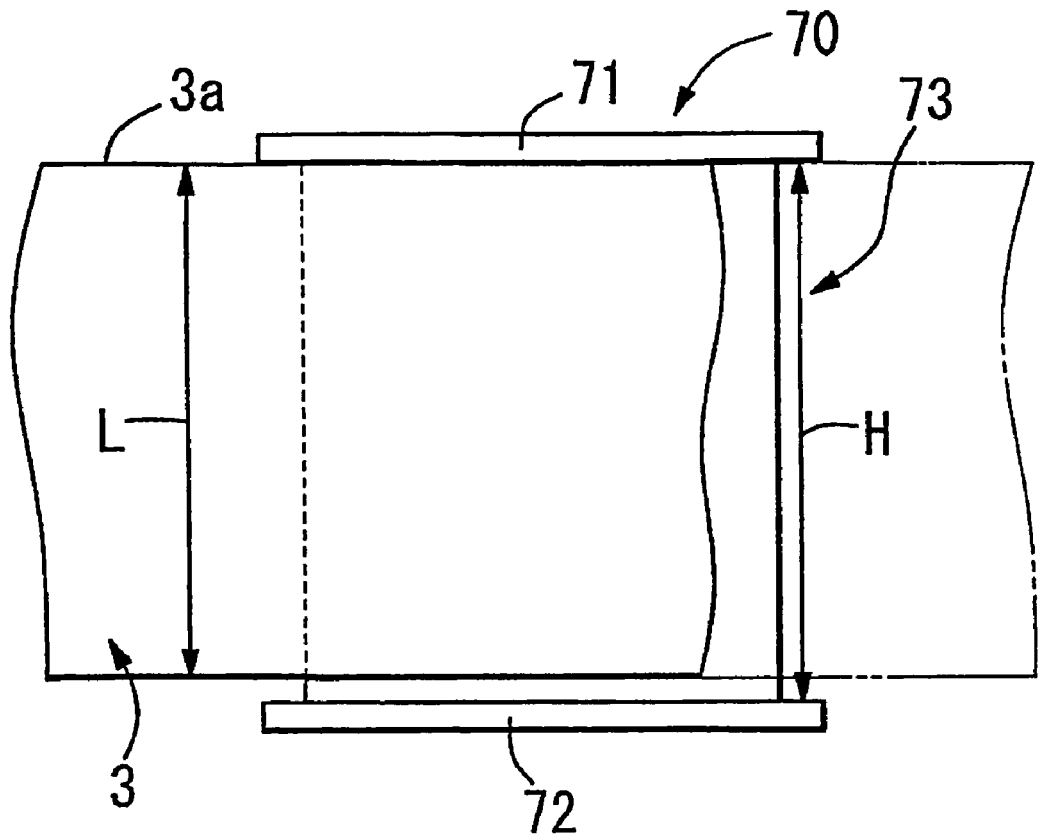
FIG. 7 is an enlarged side view of a part of the magnetically recording-reproducing unit seen from the direction of the allow A of FIG. 6, diagrammatically illustrating the magnetic tape running along a guide roller arranged in the recording-reproducing unit.

As shown in the enlarged figure of FIG. 7, flanges (71 and 72) are provided at both end portions of each guide roller (70) in its axial direction to thereby regulate the widthwise position of the magnetic tape (3), and the outer circumferential portion of the roller between each of the pair of flanges (71 and 72) is formed as a groove (73) which regulates the widthwise motion of the magnetic tape (the vertical direction on FIG. 7). The width H of this groove is usually set at a dimension several ten micrometers larger than the width L of the magnetic tape (3), while the depth of the groove (73) is generally 2 to 3 mm. The magnetic tape (3) is run while being regulated in the widthwise motion by both flanges (71 and 72) which together form the groove (73). In this case, although any reason for such a phenomenon has been clarified, PES can be made smaller, when the magnetic tape (3) is allowed to run while its tape edge (3a) which has a regulated amount of a weave with a short cycle is being in fitting contact with the inner surface of one flange (71) (located on the upper side on FIG. 7). Since the width of the groove on the guide roller is set at a dimension several ten micrometers larger than the width of the magnetic tape as mentioned above, the servo tracking inside the magnetically recording-reproducing unit is performed under the dominance of the amount of edge weave on the reference side for the tape running. However, in the servo signal-recording unit, the width of the groove on a guide roller is set at a dimension substantially equal to the width of the magnetic tape and thus has little clearance, and therefore, both edges of the magnetic tape serve as reference sides for running the tape. Accordingly, the amounts of edge weaves of both tape edges are dominant over the linearity of the servo tracking. Thus, it is necessary to regulate the amounts of the edge weaves of both tape edges below the specific values.

Figure 8:
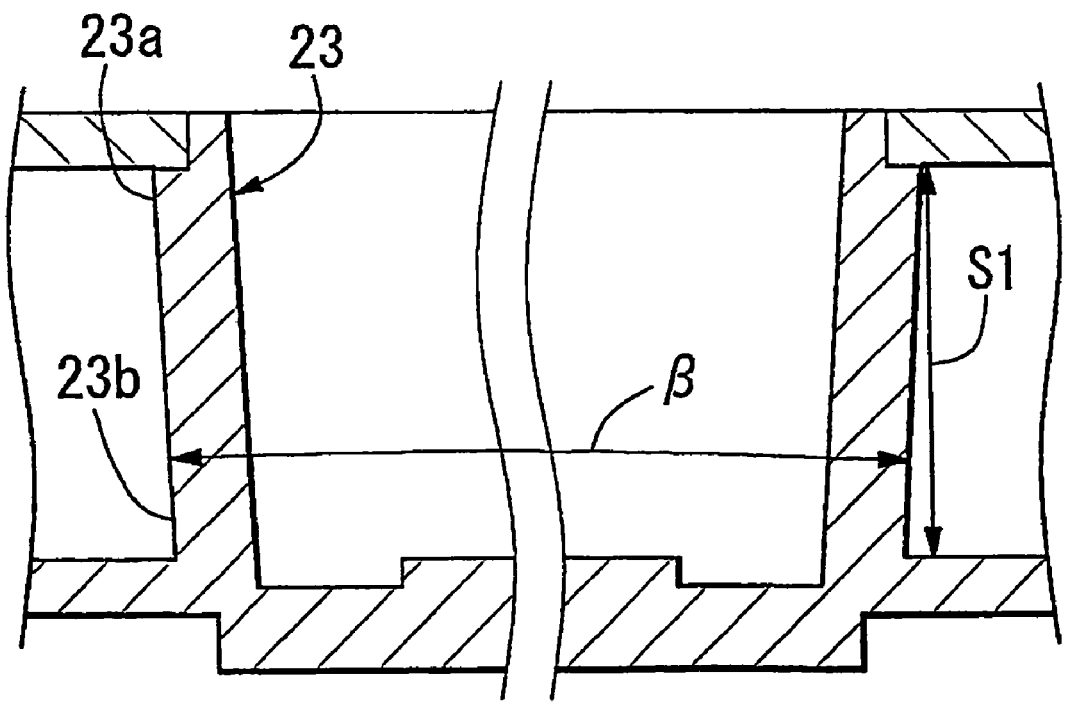
FIG. 8 is an enlarged view of the periphery of the winding shaft of the reel of the magnetic tape cartridge shown in FIG. 2, from which a part of the reel is omitted.
Figure 9:
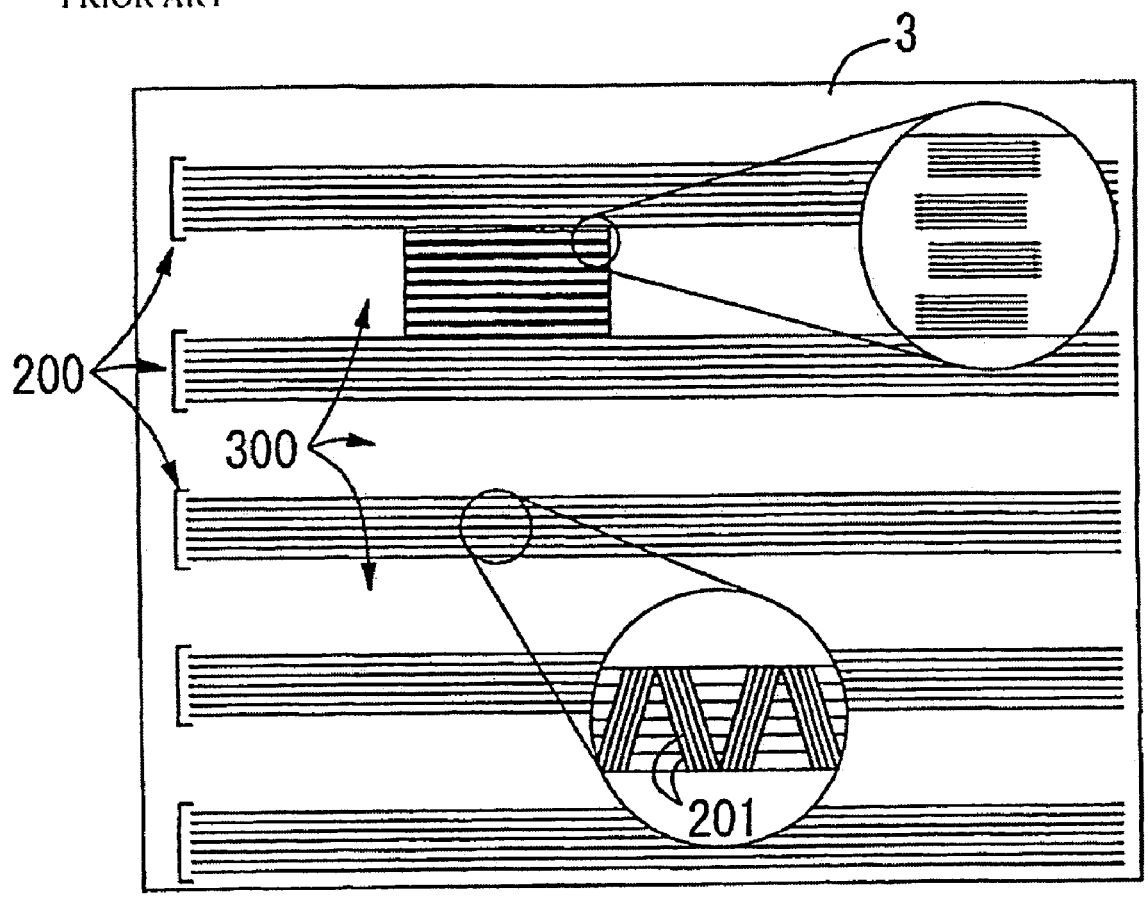
FIG. 9 is a diagram of a magnetic tape in which data tracks and servo bands are alternately formed on a magnetically recording layer (a magnetic layer), illustrating an example of the track servo control system used in the magnetic tape.

In the magnetic tape cartridge of the present invention, as shown in FIG. 8, the outer circumferential surface of the winding shaft (23) is tapered at an angle of 0.01 to 0.1 degree, so that one end face of the winding shaft (23) on the side of the edge of the tape serving as the reference side for the running of the tape (the upper end face in FIG. 8) can have a larger diameter than that of the other end face of the winding shaft (the lower end face in FIG. 8). By doing so, the magnetic tape (3) can be run along the inner surface of one flange (71) which serves as the reference side for the running of the tape inside the magnetically recording-reproducing unit. In addition, as shown in FIG. 2, the ratio of the distance S1 between the inner surfaces of the flange portions (21 and 22) which oppose to each other at a position just adjacent to the outer periphery of the winding shaft (23) and on the inner circumference of the reel, to the upper limit value P of the tape width (S1/P) is set within a range of $1.010 \leq (S1/P) \leq 1.022$, and the ratio of the distance S2 between the inner surfaces of the flange portions (21 and 22) which oppose to each other at a position which is located on the outer circumference of the reel, to the upper limit value P of the tape width (S2/P) is set within a range of $(S1/P)<(S2/P)<1.041$.

By doing so, PES becomes far smaller, so that excellent serve track performance with a little amount of off-track can be achieved. In addition, the damage of the tape edge and the winding disorder of the tape hardly occur. In this connection, the reference side for the running of the tape in the tape widthwise direction differs depending on the type of the magnetically recording-reproducing unit (the tape-driving unit). In correspondence with this difference, in some of magnetic tape cartridges, the edges of tapes facing to the upper sides of the casing bodies (1) serve as the reference sides, and in other magnetic tape cartridges, the edges of magnetic tapes facing to the lower sides of the casing bodies or both edges thereof serve as the reference sides. In the magnetic tape cartridge for use in the magnetic servo type magnetically recording-reproducing unit shown in FIG. 6, the edge of the tape facing to the upper side of the casing body (1) serves as the reference side for running the tape, as shown in FIGS. 1, 2 and 8.

Here, examples of the dimensions of the reel (2) shown in FIGS. 1 and 2, and the guide roller (70) shown in FIGS. 6 and 7 are described as below.

The outer diameter of the reel: about 97 mm (the diameter of the outermost circumference of the flange portion)

The outer diameter of the winding shaft: about 42 mm (the diameter of the outermost circumference of the winding shaft)

The dimension between the outer surfaces of the upper and lower flanges (71 and 72) of the guide roller arranged in the magnetically recording-reproducing unit: about 12.9 mm The dimension between the inner surfaces of the upper and lower flanges (71 and 72) (the width H of the groove on the guide roller): about 12.7 mm The diameters of the upper and lower flanges (71 and 72): about 12 mm The diameter of the outer circumference of the roller located between the upper and lower flanges (71 and 72): about 18 mm The reason why the outer circumferential surface of the winding shaft (23) is tapered so that the outer diameter of the winding shaft (23) on the side of the tape edge (3a) serving as the reference side for the running of the tape can be larger is as follows:

The magnetic tape (3) can be run while the edge (3a) of the tape whose edge weave amount α is regulated is being in fitting contact with the inner surface of one of the flanges (71), as the reference face for the running of the tape, on the guide roller (70) arranged in the magnetically recording-reproducing unit. As a result, PES caused by the dislocation of the relative positions of the tape edge (3a) and the flange (71) becomes smaller, and thereby, excellent serve track performance with a decreased amount of off-track can be achieved. In this case, the taper angle of the winding shaft (23) is preferably 0.01 to 0.1 degree. If the taper angle is smaller than 0.01 degree, the above effect can not be expected, while, if it is larger than 0.1 degrees, the tape edge (3a) is excessively pressed against the inner surface of one of the flanges (71), as the reference face for the running of the tape, on the guide roller (70), so that this tape edge portion of the tape is subject to damage.

The ratio of the distance S1 to the upper limit value P of the width of the tape (S1/P) is preferably set within a range of 1.010≦(S1/P)≦1.022. If it is less than 1.010, the edge portion of the tape is subject to damage, while, if it is more than 1.022, winding disorder of the tape may occur. The ratio of (S1/P) is set more preferably within a range of 1.013≦(S1/P)≦1.020, particularly within a range of 1.016≦(S1/P)≦1.018.

The ratio of the distance S2 to the upper limit value P of the width of the tape is set preferably within a range of (S1/P)<(S2/P)<1.041. When the ratio of (S2/P) is smaller than or equal to the ratio of (S1/P), the edge portion of the tape is rubbed on the flange of the reel when the tape is wound around or drawn from the reel, and thus, is subject to damage. This phenomenon is remarkable when the height of the winding shaft of the reel is slightly different from the height of the groove on the guide roller. When the ratio of (S2/P) is 1.041 or more, PES caused by the dislocation of the relative positions of the edge of the tape and the flange as the reference face for the running of the tape on the guide roller becomes relatively large, when the cycle f of the tape widthwise fluctuation is equal to the fluctuation amount. As a result, the amount of off-track tends to increase, and winding disorder of the tape may occur. Further, the ratio of (S2/P) is set preferably within a range of 1.01 (S1/P) to 1.03 (S1/P), more preferably within a range of 1.015 (S1/P) to 1.025 (S1/P).

In case of a magnetic tape cartridge housing a magnetic tape with a width of ½ inch, the distance S1 between the inner surfaces of the flange portions (21 and 22) which oppose to each other at a position on the inner circumference of the reel is, for example, 12.860 to 12.880 mm, and the distance S2 between the inner surfaces of the flange portions (21 and 22) which oppose to each other at a position on the outer circumference of the reel is, for example, 13.140 to 13.160 mm. The inner surfaces of the flange portions (21 and 23) extend linearly or substantially linearly from the inside of the inner circumference of the reel to the inside of the outer circumference thereof, as seen in the section of the reel (2) taken along the radius direction.

Generally, the magnetic tape has a curvature of about 2 mm per 1 m of the tape. It is preferable for the tape not to have such a curvature. When such a curvature can not be avoided, the curvature is set at 2 mm or less, preferably 1 mm or less. By setting the curvature at such a value, the tape can be run along the inner surface of the flange on the guide roller, as the reference face for the running of the tape, with the result that PES caused by the dislocation of the relative positions of the tape edge and the inner surface of the flange (the reference face for the running of the tape) becomes smaller. Consequently, excellent servo tracking performance with a decreased amount of off-track can be achieved. In this regard, it is hard to provide a magnetic tape with a curvature of less than 0.1 mm, and generally, a magnetic tape has a curvature of 0.1 mm or more.

Further, PES becomes larger because of the abnormal running of the tape. The following are considered as the causes for the abnormal running: (a) unbalance between a coefficient of dynamic friction between the magnetic layer of a magnetic tape and the slider (material: ALTIC (alumina/titania/carbide)) and a coefficient of dynamic friction between the magnetic layer of the magnetic tape and the guide roller (material: aluminum) (since a coefficient of dynamic friction between the magnetic layer of the magnetic tape and aluminum is equal to a coefficient of dynamic friction between the magnetic layer of the magnetic tape and SUS, the latter coefficient, of which the measuring method is established, is generally used in place of the former coefficient); and (b) the shape of a head for writing a servo signal is unsuitable. Particularly when the coefficient of dynamic friction between the magnetic tape and the slider (ALTIC) is high, PES becomes larger because the magnetic tape moves in the widthwise direction simultaneously with the movement of the magnetic head array in the widthwise direction of the tape, so that the off-track amount becomes larger. Therefore, it is necessary that the coefficient of dynamic friction between the magnetic layer of the magnetic tape and the slider (ALTIC) should be 0.35 or less, preferably 0.1 to 0.3, more preferably 0.1 to 0.25. Generally, the coefficient of dynamic friction between the magnetic layer of the magnetic tape and SUS is 0.1 to 0.3, and that between the backcoat layer of the magnetic tape and SUS, 0.1 to 0.3. It is hard to lower these coefficients to less than 0.10.

A rise in PES caused by the abnormal running of the magnetic tape becomes smaller, when the ratio of $\mu_{mSL}$ to $\mu_{mSUS}$ [$(\mu_{mSL})/(\mu_{mSUS})$] is from 0.7 to 1.3, wherein $\mu_{mSL}$ is a coefficient of dynamic friction between the magnetic layer and the slider material and $\mu_{mSUS}$ is a coefficient of dynamic friction between the magnetic layer and SUS. A rise in PES caused by the abnormal running of the magnetic tape becomes smaller, when the ratio of [$(\mu_{mSL})/(\mu_{BSUS})$] is from 0.8 to 1.5, wherein $\mu_{mSUS}$ is as coefficient of dynamic friction between the backcoat layer and SUS.

Hereinafter, the preferred examples of the elements used according to the present invention will be explained.

<Non-Magnetic Support>

The thickness of the non-magnetic support is preferably 7.0 μm or less, more preferably from 2.0 to 7.0 μm. When the thickness of the non-magnetic support is less than 2 μm, it is difficult to form a film. Furthermore, the strength of the resultant magnetic tape decreases. When the thickness of the non-magnetic support exceeds 7.0 μm, the total thickness of the magnetic tape increases so that the recording capacity per one reel decreases.

The Young's modulus E of the non-magnetic support in the lengthwise direction depends on the thickness of the support, and is usually at least 4.9 GPa (500 kg/mm$^2$), preferably at least 5.88 GPa (600 kg/mm$^2$), more preferably at least 6.86 GPa (700 kg/mm$^2$). When the Young's modulus of the support is less than 5.88 GPa (600 kg/mm$^2$), the strength of the magnetic tape may decrease or the feeding of the magnetic tape may become unstable. When the thickness T of the support is 5.0 μm or less, the rigidity (E.T$^3$) decreases, so that the tape strength lowers. Thus, the Young's modulus is preferable at least 9.8 GPa (1,000 kg/mm$^2$).

The ratio of Young's modulus MD in the lengthwise direction to Young's modulus TD in the widthwise direction (MD/TD) of the non-magnetic support is preferably from 10 to 1.8, more preferably from 1.1 to 1.7, far preferably from 1.2 to 1.6, in the linear recording type as in the present invention. When this ratio is within this range, the head touch is improved.

Examples of such a non-magnetic support include a polyethylene naphthalate film, an aromatic polyamide film, an aromatic polyimide film, etc.

Generally, both the magnetic layer-forming surface and the backcoat layer-forming surface of the non-magnetic support have a center line average surface roughness Ra of 5.0 to 10 nm. In order to decrease the spacing loss by decreasing the average surface roughness Ra of the magnetic layer, such a non-magnetic support that has a magnetic layer-forming surface having an average surface roughness Ra of 10 to 5.0 nm (Ra of the backcoat layer-forming surface is 5.0 to 10 nm) is used. The non-magnetic support of this type is called dual type, which is constructed by laminating two types of non-magnetic supports.

<Primer Layer>

The primer layer may be formed if needed. The thickness of the primer layer is preferably from 0.3 to 3.0 μm, more preferably from 0.5 to 2.1 μm. When the thickness of the primer layer is less than 0.3 μm, the durability of the magnetic recording medium may deteriorate. When the thickness of the primer layer exceeds 3.0 μm, the effect to improve the durability of the magnetic recording medium is saturated. Furthermore, in case of a magnetic tape, the total thickness of the magnetic tape increases, the length of the tape per one reel decreases, so that the recording capacity decreases.

The primer layer may contain carbon black (CB) to improve the conductivity, or non-magnetic particles to control the viscosity of a paint and the stiffness of the magnetic tape.

Examples of the non-magnetic particles to be contained in the primer layer include titanium oxide, iron oxide, alumina, etc. Among them, iron oxide, or a mixture of iron oxide and alumina is preferable.

The surface roughness of the magnetic layer, which is formed on the primer layer by a wet-on-wet method, can be reduced, when the primer layer contains 15 to 35% by weight of carbon black having a particle size of 10 to 100 nm, 35 to 83% by weight of non-magnetic iron oxide having a major axis length of 0.05 to 0.20 μm and a minor axis length of 5 to 200 nm, and optionally 0 to 20% by weight of alumina having a particle size of 10 to 100 nm, based on the total weight of the inorganic particles contained in the primer layer.

In general, the non-magnetic iron oxide has a needle shape. When particulate or amorphous non-magnetic iron oxide is used, its particle size is preferably from 5 to 200 nm.

The present invention does not exclude the addition of large size carbon black having a particle size of 100 nm or more, provided that the surface smoothness is not impaired. In this case, the total amount of the small size carbon black CB and the large size carbon black CB is preferably within the above range.

Examples of carbon black (CB) to be added to the primer layer are acetylene black, furnace black, thermal black, etc. Such carbon black usually has a particle size of 5 to 200 nm, preferably 10 to 100 nm. When the particle size of carbon black is less than 10 nm, it may be difficult to disperse the carbon black particles in the primer layer since carbon black has a structure. When the particle size of carbon black exceeds 100 nm, the surface smoothness of the primer layer deteriorates.

The amount of carbon black to be contained in the primer layer may depend on the particle size of carbon black, and is preferably from 15 to 35% by weight. When the amount of carbon black is less than 15% by weight, the conductivity may not be sufficiently increased. When the amount of carbon black exceeds 35% by weight, the effects of the addition of carbon black may saturate. More preferably, carbon black having a particle size of 15 to 80 nm is used in an amount of 15 to 35% by weight, and particularly, carbon black having a particle size of 20 to 50 nm is used in an amount of 20 to 30% by weight. When carbon black having the above particle size is used in the above-defined amount, the electrical resistance of the magnetic tape is decreased and the feeding irregularity is suppressed.

The non-magnetic iron oxide to be added to the primer layer preferably has a major axis length of 0.05 to 0.20 μm and a minor axis length (particle diameter) of 5 to 200 nm in the case of the needle-shape particles, or a particle size of 5 to 200 nm, more preferably 0.05 to 150 nm, particularly preferably 0.05 to 100 nm in the case of the particulate or amorphous shape particles. In particular, the needle-shape iron oxide particles are preferable, since the orientation of the magnetic layer can be improved. The amount of the non-magnetic iron oxide to be added to the primer layer is preferably from 35 to 83% by weight, more preferably from 40 to 80% by weight, particularly from 50 to 75% by weight. When the particle size of the non-magnetic iron oxide (the minor axis length in case of the needle shape particle) is less than 5 nm, the iron oxide particles may not be uniformly dispersed. When the particle size exceeds 200 nm, the unevenness of the interface between the primer layer and the magnetic layer may be worsened. When the amount of the non-magnetic iron oxide is less than 35% by weight, the effect to increase the strength of the primer layer is small. When the amount of the iron oxide exceeds 83% by weight, the strength of the primer layer may rather decrease.

The primer layer may contain alumina in addition to iron oxide. The particle size of alumina is preferably from 10 to 100 nm, more preferably from 20 to 100 nm, particularly from 30 to 100 nm. When the particle size of alumina is less than 10 nm, the alumina particles may not be uniformly dispersed in the primer layer. When the particle size of alumina exceeds 100 nm, the unevenness of the interface between the primer layer and the magnetic layer may be worsened. The amount of alumina to be added to the primer layer is usually from 0 to 20% by weight, preferably from 2 to 10% by weight, more preferably from 4 to 8% by weight.

<Lubricant>

A coating layer including the primer layer and the magnetic layer may contain a lubricant having a different function. Preferably, the coefficient of dynamic friction of the magnetic tape against the guide of the feeding system or the slider of the MR head can be decreased, when the primer layer contains 0.5 to 4.0% by weight of a higher fatty acid and 0.2 to 3.0% by weight of a higher fatty acid ester, based on the weight of the entire powder components in the primer layer. When the amount of the higher fatty acid is less than 0.5% by weight, the effect to decrease the coefficient of dynamic friction is insufficient. When the amount of the higher fatty acid exceeds 4.0% by weight, the primer layer may be plasticized and thus the toughness of the primer layer may be lost. When the amount of the higher fatty acid ester is less than 0.2% by weight, the effect to decrease the coefficient of friction is insufficient. When the amount of the higher fatty acid ester exceeds 3.0% by weight, the amount of the higher fatty acid ester which migrates to the magnetic layer may become large, so that the magnetic tape may stick to the guide or the like of the feeding system.

The coefficient of dynamic friction of the magnetic tape against the guide roller of the feeding system or the slider of the MR head can be decreased, when the magnetic layer contains 0.2 to 3.0% by weight of a fatty acid amide and 0.2 to 3.0% by weight of a higher fatty acid ester, based on the weight of the ferromagnetic powder. When the amount of the fatty acid amide is less than 0.2% by weight, the coefficient of dynamic friction between the head slider and the magnetic layer tends to increase. When the amount of the fatty acid amide exceeds 3.0% by weight, the fatty acid amide may bleed out and causes a defect such as dropout.

As the fatty acid, higher fatty acids such as lauric acid, myristic acid, palmitic acid, stearic acid, behenic acid, oleic acid, linoleic acid, etc. can be used. As the fatty acid ester, butyl stearate, octyl stearate, amyl stearate, isooctyl stearate, octyl myristate, butoxyethyl stearate, anhydrous sorbitan monostearate, anhydrous sorbitan distearate, anhydrous sorbitan tristearate, etc. can be used. As the fatty acid amide, the amides of palmitic acid, stearic acid and the like can be used.

The intermigration of the lubricants between the magnetic layer and the primer layer is not excluded.

The coefficient of dynamic friction between the magnetic layer and the slider of the MR head is preferably 0.35 or less, more preferably from 0.1 to 0.3, particularly from 0.1 to 0.25. When this coefficient of dynamic friction exceeds 0.30, the spacing loss tends to arise due to the contamination of the slider. In addition, PES becomes larger, and the off-track amount increases, because the magnetic tape moves in the widthwise direction when the magnetic head array is moved in the tape widthwise direction. The coefficient of dynamic friction of less than 0.10 is hardly realized.

The coefficient of dynamic friction between the magnetic layer and SUS is usually from 0.1 to 0.3, preferably from 0.10 to 0.25, more preferably from 0.10 to 0.20. When this coefficient of dynamic friction exceeds 0.25, the head and the guide rollers may easily be contaminated. It is difficult to decrease this coefficient of dynamic friction to less than 0.10.

The ratio of $\mu_{mSL}$ to $\mu_{mSUS}$ [$(\mu_{mSL})/(\mu_{mSUS})$] is usually from 0.7 to 1.3, preferably from 0.8 to 1.0. In this preferred range, a rise in PES due to abnormality in the feeding of the magnetic tape becomes smaller and also off-track becomes smaller.

<Magnetic Layer>

The thickness of the magnetic layer is usually 0.3 µm or less, preferably from 0.01 to 0.20 µm, more preferably from 0.01 to 0.15 µm, particularly from 0.01 to 0.10 µm.

When the thickness of the magnetic layer is less than 0.01 µm, it is difficult to form a uniform magnetic layer. When the thickness of the magnetic layer exceeds 0.3 µm, the reproducing output may decrease due to the thickness loss, or the product (Brδ) of the residual magnetic flux density (Br) and the thickness (δ) becomes too large, so that the reproducing output tends to be skewed due to the saturation of the MR head.

The product of the residual magnetic flux density in the lengthwise direction and the thickness of the magnetic layer is preferably from 0.0018 to 0.06 µTm, more preferably from 0.036 to 0.050 µTm. When this product is less than 0.0018 µTm, the reproducing output with the MR head may be low. When this product exceeds 0.06 µTm, the reproducing output with the MR head tends to be skewed. The use of a magnetic tape having such a magnetic layer is effective to shorten the recording wavelength, increase the reproducing output when signals are reproduced with the MR head, and decrease the skew in the reproducing output, so that, preferably, the ratio of output to noises can be increased.

The coercive force of the magnetic layer is preferably from 120 to 320 kA/m, more preferably from 140 to 320 kA/m, particularly from 160 to 320 kA/m. When the coercive force of the magnetic layer is less than 120 kA/m, the output is decreased by the demagnetizing field demagnetization, when the recording wavelength is shortened. When the coercive force exceeds 320 kA/m, the recording with the magnetic head may become difficult.

The center line average surface roughness Ra of the magnetic layer is preferably 3.2 nm or less, more preferably 0.5 to 3.2 nm, further preferably 0.7 to 3.2 nm, particularly preferably 0.7 to 2.9 nm. When the center line average surface roughness Ra is less than 0.5 nm, the running of the magnetic tape becomes unstable. When the center line average surface roughness Ra exceeds 3.2 nm, PW 50 (the half width of the reproduction output) becomes larger or the output lowers, so that the error rate becomes higher.

As the magnetic powder to be added to the magnetic layer, ferromagnetic iron metal powder such as Fe powder, Fe—Co powder and Fe—Nd—B powder, hexagonal barium ferrite powder, etc. may be used. The coercive force of the ferromagnetic iron metal powder and hexagonal barium ferrite powder is preferably from 120 to 320 kA/m. The saturation magnetization is preferably from 120 to 200 A·m$^2$/kg (120 to 200 emu/g), more preferably from 130 to 180 A·m$^2$/kg (130 to 180 emu/g) in case of the ferromagnetic iron metal powder. It is preferably from 50 to 70 A·m$^2$/kg (50 to 70 emu/g) in case of the hexagonal barium ferrite powder. The magnetic characteristics of the magnetic layer and the ferromagnetic powder are measured with a sample-vibration type fluxmeter under an external magnetic field of 128 MA/m (16 kOe).

An average major axis length of the needle-shape ferromagnetic iron metal powder such as Fe powder and Fi-Co powder to be used in the magnetic tape of the present invention is preferably from 0.03 to 0.2 µm, more preferably from 0.03 to 0.18 µm, particularly from 0.03 to 0.15 µm. When the average major axis length is less than 0.03 µm, the dispersion of the powder in the paint is difficult since the agglomeration force of the magnetic powder increases. When the average major axis length exceeds 0.2 µm, the coercive force decreases, or the particle noise due to the particle size increases. For the same reason, the particle size of particulate ferromagnetic iron metal powder such as Fe—Co—B powder is preferably from 5 to 200 nm, and the plate size of the hexagonal barium ferrite powder is preferably from 5 to 200 nm.

The average major axis length and the particle size are obtained by actually measuring the particle sizes on a photograph taken with a scanning electron microscope (SEM) and averaging the measured values of 100 particles.

The BET specific surface area of the ferromagnetic iron metal powder is preferably at least 35 m$^2$/g, more preferably at least 40 m$^2$/g, most preferably at least 50 m$^2$/g. The BET specific surface area of the hexagonal barium ferrite powder is preferably 1 to 100 m$^2$/g.

A binder to be contained in the primer layer or the magnetic layer may be a combination of a polyurethane resin and at least one resin selected from the group consisting of a vinyl chloride resin, a vinyl chloride-vinyl acetate copolymer resin, a vinyl chloride-vinyl alcohol copolymer resin, a vinyl chloride-vinyl acetate-vinyl alcohol copolymer resin, a vinyl chloride-vinyl acetate-maleic anhydride copolymer resin, a vinyl chloride-hydroxyl group-containing alkyl acrylate copolymer resin, nitrocellulose (cellulose resins), and the like. Among them, a mixture of the vinyl chloride-hydroxyl group-containing alkyl acrylate copolymer resin and the polyurethane resin is preferably used. Examples of the polyurethane resin include polyesterpolyurethane, polyetherpolyurethane, polyetherpolyesterpolyurethane, polycarbonatepolyurethane, polyestrepolycarbonatepolyurethane, etc.

Preferably, a binder resin such as a urethane resin having COOH, $SO_3M$, $OSO_2M$, $P=O(OM)_3$, $O—P=O(OM)_2$ [wherein M is a hydrogen atom, an alkali metal base or an amine salt], OH, $NR^1R^2$, $N^+R^3R^4R^5$ [wherein $R^1$ to $R^5$ are each a hydrogen atom or a hydrocarbon group], or an epoxy group as a functional group is used. The reason why such a binder is used is that the dispersibility of the magnetic powder, etc. is improved. When two or more resins are used in combination, it is preferable that the polarities of the functional groups of the resins are the same. In particular, the combination of the resins both having —$SO_3M$ groups is preferable.

The binder is used in an amount of 7 to 50 parts by weight, preferably from 10 to 35 parts by weight, based on 100 parts by weight of the ferromagnetic powder in case of the magnetic layer, or based on total 100 parts by weight of carbon black and non-magnetic powder in case of the primer layer. In particular, the combination of 5 to 30 parts by weight of the vinyl chloride-based resin and 2 to 20 parts by weight of the polyurethane resin is best.

It is preferable to use a thermally curable crosslinking agent, which bonds with the functional groups in the binder to crosslink the binder. As the crosslinking agent, polyisocyanates, for example, tolylene diisocyanate, hexamethylene diisocyanate, isophorone diisocyanate; reaction products of these isocyanates with compounds having plural hydroxyl groups such as trimethylolpropane; condensation products of these isocyanates, and the like are preferably used. The crosslinking agent is used in an amount of 5 to 50 parts by weight, preferably 7 to 35 parts by weight, based on 100 parts of the binder. When the amount of the crosslinking agent contained in the magnetic layer is about 50% of that contained in the primer layer, for example, 30 to 60% thereof, the coefficient of dynamic friction of the magnetic layer against the slider of the MR head is preferably decreased. The reason why this range (30 to 60%) is preferable is that, when this ratio is less than 30%, the film strength of the magnetic layer may decrease, while, when this ratio exceeds 60%, the LRT treatment conditions should be made severe to decrease the coefficient of dynamic friction against the slider, which leads to the increase of cost.

The magnetic layer may contain conventional carbon black (CB) to improve the conductivity and the surface lubricity. As carbon black, acetylene black, furnace black, thermal black, etc. may be used. Carbon black having a particle size of 5 to 100 nm is generally used, and carbon black having a particle size of 10 to 100 nm is preferably used. When the particle size of carbon black is less than 5 nm, the dispersion of carbon black particles is difficult. When the particle size of carbon black exceeds 100 nm, a large amount of carbon black should be added. In either case, the surface of the magnetic layer is roughened and thus the output may decrease.

The amount of carbon black is preferably from 0.2 to 5% by weight, more preferably from 0.5 to 4% by weight, particularly from 0.5 to 3.5% by weight, and 0.5 to 3% by weight as the best, based on the weight of the ferromagnetic powder. When the amount of carbon black is less than 0.2% by weight, the effect of the addition of carbon black is insufficient. When the amount of carbon black exceeds 5% by weight, the surface of the magnetic layer tends to be rough.

<Backcoat Layer>

To improve the tape-running rate, a conventional backcoat layer with a thickness of from 0.2 to 0.8 µm may be used. When the thickness of the backcoat layer is less than 0.2 µm, the effect to improve the tape-running rate is insufficient. When the thickness of the backcoat layer exceeds 0.8 µm, the total thickness of the magnetic tape increases, so that the recording capacity of the tape per one reel decreases.

The coefficient of dynamic friction between the backcoat layer and SUS is preferably from 0.10 to 0.30, more preferably from 0.10 to 0.25. When this coefficient of dynamic friction is less than 0.10, the magnetic tape easily slips on the guide rollers, so that the running of the tape becomes unstable. When this coefficient of dynamic friction exceeds 0.30, the guide rollers tend to be contaminated. The ratio of $\mu_{mSL}$ to $\mu_{BSUS}$ [$(\mu_{mSL})/(\mu_{BSUS})$] is preferably from 0.8 to 1.5, more preferably from 0.9 to 1.4. Outside this range, the off-track of the magnetic tape due to the tape-meandering may be worsened.

As carbon black (CB) to be contained in the backcoat layer, acetylene black, furnace black, thermal black, etc. can be used. In general, carbon black with a small particle size and carbon black with a large particle size are used. The particle size of small particle size carbon black is usually from 5 to 100 nm, preferably from 10 to 100 nm. When the particle size of small particle size carbon black is less than 10 nm, the dispersion thereof is difficult. When the particle size of small particle size carbon black exceeds 100 nm, a large amount of carbon black should be added. In either case, the surface of the backcoat layer is roughened and thus the surface roughness of the backcoat layer may be transferred to the magnetic layer (embossing).

When the large particle size black carbon having a particle size of 250 to 400 nm is used in an amount of 5 to 15% by weight of the small particle size carbon black, the surface of the backcoat is not roughened and the effect to increase the tape-running rate is increased. The total amount of the small particle size carbon black and the large particle size carbon black is preferably from 60 to 98% by weight, more preferably from 70 to 95% by weight, based on the weight of inorganic powders in the backcoat layer. The center line average surface roughness Ra of the backcoat layer is preferably from 3 to 15 nm, more preferably from 4 to 10 nm.

To increase the strength of the backcoat layer, it is preferable to add iron oxide and alumina both having a particle size of 0.1 to 0.6 µm, preferably 0.2 to 0.5 µm to the backcoat layer. The amount of the iron oxide and the alumina is preferably from 2 to 40% by weight, more preferably from 5 to 30% by weight, based on the weight of the inorganic powder in the backcoat layer.

The binder to be contained in the backcoat layer may be the same binders as those used in the magnetic layer and the primer layer. Among these binders, the combination of the cellulose resin and the polyurethane resin is preferably used so as to decrease the coefficient of friction and to improve the tape-running rate.

The amount of the binder in the backcoat layer is usually from 40 to 150 parts by weight, preferably from 50 to 120 parts by weight, more preferably from 60 to 110 parts by weight, particularly from 70 to 110 parts by weight, based on the total 100 parts by weight of the carbon black and the inorganic powder in the backcoat layer. When the amount of the binder is less than 50 parts by weight, the strength of the backcoat layer is insufficient. When the amount of the binder exceeds 120 parts by weight, the coefficient of friction may become too large. Preferably, 30 to 70 parts by weight of the cellulose resin and 20 to 50 parts by weight of the polyurethane resin are used. To cure the binder, a crosslinking agent such as a polyisocyanate compound is preferably used.

The crosslinking agent to be contained in the backcoat layer may be the same as those used in the magnetic layer and the primer layer. The amount of the crosslinking agent is usually from 10 to 50 parts by weight, preferably from 10 to 35 parts by weight, more preferably from 10 to 30 parts by weight, based on 100 parts by weight of the binder. When the amount of the crosslinking agent is less than 10 parts by weight, the film strength of the backcoat layer tends to decrease. When the amount of the crosslinking agent exceeds 35 parts by weight, the coefficient of dynamic friction of the backcoat layer against SUS increases.

The special-purpose backcoat layer, on which magnetic servo signals are recorded, may contain 30 to 60 parts by weight of the ferromagnetic powder which is used in the magnetic layer, 40 to 70 parts by weight of carbon black to be used in the backcoat layer, and optionally 2 to 15 parts by weight of the iron oxide and/or alumina to be used in the backcoat layer. As the binder, the resin to be used in the backcoat layer is used in an amount of usually 40 to 150 parts by weight, preferably 50 to 100 parts by weight, based on total 100 parts by weight of the ferromagnetic powder, the carbon black and the non-magnetic inorganic powder. As the crosslinking agent, the crosslinking agent described above is used usually in an amount of 10 to 50 parts by weight per 100 parts by weight of the binder. For the same reason as described with regard to the magnetic layer, preferably, the coercive force is from 120 to 320 kA/m, and the product of the residual magnetic flux density Br and the thickness is from 0.018 to 0.06 μTm.

<LRT (Lapping/Rotary/Tissue) Treatment>

The magnetic layer is subjected to a LRT treatment comprising a lapping, rotary and tissue treatments, so as to optimize the surface smoothness, the coefficient of dynamic friction against the slider of the MR head and the cylinder material, the surface roughness and the surface shape. Thereby, the running rate of the magnetic tape and the reproducing output with the MR head are improved, and the spacing loss is reduced.

(1) Lapping

An abrasive tape (lapping tape) is moved by the rotary roll at a constant rate (standard: 14.4 cm/min.) in a direction opposite to the tape-feeding direction (standard: 400 m/min.), and is brought into contact with the magnetic layer of the magnetic tape while being pressed under the guide block. In this step, the magnetic layer is polished while the unwinding tension of the magnetic tape and the tension of the lapping tape being maintained constant (standard: 100 g and 250 g, respectively). The abrasive tape (lapping tape) used in this step may be an abrasive tape (lapping tape) with fine abrasive particles such as M20000, WA10000 or K10000. It is possible to use an abrasive wheel (lapping wheel) in place of or in combination with the abrasive tape (lapping tape). When frequent replacement is necessary, the abrasive tape (lapping tape) alone is used.

(2) Rotary Treatment

A rotary wheel having air-bleeding grooves (standard: width 1 inch (25.4 mm); diameter 60 mm; width of air-bleeding grooves 2 mm; angle of groove 45 degrees, manufactured by KYOWA SEIKO Co., Ltd.) is rotated at a constant revolution rate (usually 200 to 3,000 rpm; standard: 1,100 rpm) in a direction opposite to the feeding direction of the magnetic layer, and allowed to be in contact with the magnetic layer of the magnetic tape at a constant contact angle (standard: 90 degrees). Thus, the surface of the magnetic layer is treated.

(3) Tissue Treatment

Tissue (a non-woven fabric, for example, Traysee manufactured by Toray) is fed at a constant rate (standard: 14.0 mm/min.) by rotary bars, in a direction opposite to the feeding direction of the magnetic tape, while the rotary rods being pressed against the surface of the backcoat layer and the surface of the magnetic layer of the magnetic tape, respectively to clean the surfaces.

EXAMPLES

The present invention will be explained in detail by way of the following Examples, which do not limit the scope of the invention in any way. In Examples and Comparative Examples, "parts" are "parts by weight", unless otherwise specified.

Example 1

| <Components of a paint for undercoat layer> | |
|---|---|
| (1) | |
| Iron oxide powder (particle size: 0.11 × 0.02 μm) | 68 parts |
| α-Alumina (particle size: 0.07 μm) | 8 parts |
| Carbon black (particle size: 25 nm; oil absorption: 55 g/cc) | 24 parts |
| Stearic acid | 2.0 parts |
| Vinyl chloride-hydroxypropyl acrylate copolymer (—SO$_3$Na group content: $0.7 \times 10^{-4}$ eq./g) | 8.8 parts |
| Polyesterpoyurethane resin (Tg: 40° C., —SO$_3$Na group content: $1 \times 10^{-4}$ eq./g) | 4.4 parts |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate (Colonate L manufactured by Nippon Polyurethane) | 4.4 parts |
| Cyclohexanone | 10 parts |
| Methyl ethyl ketone | 15 parts |
| Toluene | 10 parts |

| <Components of a paint for magnetic layer> | |
|---|---|
| (1) | |
| Ferromagnetic iron metal powder (Co/Fe: 20 atomic %, Y/(Fe + Co): 3 atomic %, Al/(Fe + Co): 5 wt. %, Ca/Fe: 0 wt. %; σs: 155 A·m$^2$/kg, Hc: 149.6 kA/m, pH: 9.4, major axis length: 0.10 μm) | 100 parts |
| Vinyl chloride-hydroxypropyl acrylate copolymer (—SO$_3$Na group content: $0.7 \times 10^{-4}$ eq./g) | 12.3 parts |
| Polyesterpoyurethane resin (—SO$_3$Na group content: $1 \times 10^{-4}$ eq./g) | 5.5 parts |
| α-Alumina (particle size: 0.12 μm) | 8 parts |
| α-Alumina (particle size: 0.07 μm) | 2 parts |
| Carbon black (particle size: 75 nm; DBP oil absorption: 72 cc/100 g) | 1.0 part |

-continued

<Components of a paint for magnetic layer>

| | |
|---|---|
| Metal acid phosphate | 2 parts |
| Palmitic acid amide | 1.5 parts |
| n-Butyl stearate | 1.0 part |
| Tetrahydrofuran | 65 parts |
| Methyl ethyl ketone | 245 parts |
| Toluene | 85 parts |
| (2) | |
| Polyisocyanate | 2.0 parts |
| Cyclohexanone | 167 parts |

A paint for primer layer was prepared by kneading the components of Group (1) with a kneader, adding the components of Group (2) to the mixture, and stirring them, dispersing the mixed components with a sand mill in a residence time of 60 minutes, and adding the components of Group (3), followed by stirring and filtering the mixture.

Separately, a magnetic paint was prepared by kneading the components of Group (1) with a kneader, dispersing the mixture with a sand mill in a residence time of 45 minutes, and adding the components of Group (2), followed by stirring and filtering the mixture.

The paint for primer layer was applied on a non-magnetic support made of a polyethylene naphthalate film (thickness of 6.2 μm, MD=6.08 GPa, MD/TD=1.3; manufactured by TEIJIN) so that the primer layer could have a thickness of 1.8 μm after dried and calendered, and then, the paint for magnetic layer was applied on the primer layer by a wet-on-wet method so that the magnetic layer could have a thickness of 0.15 μm after the magnetic paint layer had been oriented in a magnetic field, dried and calendered. After orientation in the magnetic field, the layer was dried with a drier to obtain a magnetic sheet. The orientation in the magnetic field was carried out by arranging N-N opposed magnets (5 kG) in front of the drier, and arranging two pairs of N—N opposed magnets (5 kG) at an interval of 50 cm at a position 75 cm before the finger-touch layer-drying position in the drier. The coating rate was 100 m/min.

<Components of a paint for backcoat layer>

| | |
|---|---|
| Carbon black (particle size: 25 nm) | 80 parts |
| Carbon black (particle size: 370 nm) | 10 parts |
| Iron oxide (major axis length: 0.4 μm; acicular ratio: about 10) | 10 parts |
| Nitrocellulose | 45 parts |
| Polyurethane resin (containing SO$_3$Na groups) | 30 parts |
| Cyclohexanone | 260 parts |
| Toluene | 260 parts |
| Methyl ethyl ketone | 525 parts |

The components of a paint for backcoat layer were dispersed with a sand mill in a residence time of 45 minutes and a polyisocyanate (15 parts) was added to the mixture to obtain a paint for backcoat layer. After filtration, the paint was coated on a surface of the magnetic sheet opposite to the magnetic layer so that the backcoat layer could have a thickness of 0.5 μm after dried and calendered, and then, the backcoat layer was dried to finish the magnetic sheet.

The magnetic sheet obtained was planished by seven-stage calendering using metal rolls at a temperature of 100° C. under a linear pressure of 150 kg/cm, and wound around a core and aged at 70° C. for 72 hours.

<Slitting Treatment>

Next, the slitting system (100) shown in FIG. 4 was used to slit the magnetic sheet G into a plurality of magnetic tapes (3) with a width of ½ inch. FIG. 5 is an enlarged view of the sucking section of the tension cut roller (50) shown in FIG. 4. The sucking section comprises sucking portions (51) which are communicated with a suction source (not shown) to suck the magnetic sheet, and tape-contacting portions (52) which contact the magnetic sheet at their outer peripheries. The sucking portions (51) and the tape-contacting portions (52) are arranged alternately and at regular intervals along the outer circumferential surface of the tension cut roller (50). As seen in FIG. 5, the distance in the circumferential direction from the rear end of one sucking portion (51) to the rear end of the next sucking portion (51), in other words, the cycle TI of the sucking portions (51) is 13.5 mm. The sucking portions (51) are packed with a porous metal material to provide mesh sucking portions. The slitting system (100) equipped with the above tension cut roller (50) was used to slit the magnetic sheet G under the conditions of a sucking pressure of $1.33 \times 10^4$ Pa (100 mmHg) and a winding angle of 188 degrees at which the magnetic sheet G was wound around the tension cut roller (50). Although not shown herein, the power-transmitting unit for transmitting the power from the driving motor to the cutter-driving member (60) shown in FIG. 4 employed a flat belt as the driving belt, and a rubber coupling as the coupling so as to absorb the vibrations from the driving motor. Then, a LRT treatment is carried out under the following conditions.

<LRT (Lapping/Rotary/Tissue) Treatment>

(1) Lapping

An abrasive tape (lapping tape) was fed by a rotary roll at a rate of 14.4 cm/min. in a direction opposite to the feeding direction of the magnetic tape (400 m/min.), and was pressed down from above by a guide roller to be brought into contact with the magnetic layer of the magnetic tape. In this step, the magnetic layer was polished while the unwinding tension of the magnetic tape being maintained at 100 g and the tension of the lapping tape, at 250 g.

(2) Rotary Aluminum Wheel Treatment

An aluminum rotary wheel having air-bleeding grooves with a width of 2 mm (the angle of groove 45 degrees, manufactured by KYOWA SEIKO Co., Ltd.;), which had a width of 25.4 mm and a diameter of 60 mm, was rotated at a revolution rate of 1,100 rpm in a direction opposite to the feeding direction of the magnetic tape and brought into contact with the magnetic layer of the magnetic tape at a contact angle of 90 degrees. Thus, the surface of the magnetic layer was treated.

(3) Tissue Treatment

The tissue (a non-woven fabric: Toraysee manufactured by Toray) was fed at a rate of 14.0 mm/min. in a direction opposite to the feeding direction of the magnetic tape by a rotary bar to clean the surface of the magnetic tape.

Magnetic servo signals were written on the magnetic layer of the magnetic tape at a rate of 4 m/sec. (4,000 mm/sec.), using a servo writer, and this magnetic tape was wound around a reel and set in a casing body. Thus, a magnetic tape cartridge for use in a computer shown in FIGS. 1 and 2 was constructed.

The reel used in this cartridge included a winding shaft whose outer circumferential surface was tapered at an angle of 0.03 degrees (taper angle: β) so that the diameter of the upper end face thereof on the side of the edge of the tape as the reference side for the running of the tape could be larger. The distance S1 between the inner surfaces of the flange portions at a position on the inner circumference of the reel therein was 12.93 mm; the ratio (S1/P) of S1 to the upper limit value P of the width of the magnetic tape which was 12.656 mm was 1.022; the distance S2 between the inner surfaces of the flange portions at a position on the outer circumference of the reel therein was 13.16 mm; and the ratio of (S2/P) was 1.040 which was larger than 1.020 (S1/P).

Examples 2 to 13

Magnetic tape cartridges for computers of Examples 2 to 13 were constructed in the same manner as in Example 1, except that a part of the conditions were changed to the conditions indicated in Tables 2 or 3. The term, "direct drive" as seen below means the motor's direct driving of the cutter-driving section without using any power-transmitting device using a belt, in order to prevent the occurrence of edge weave due to the vibration of the drive belt.

Comparative Examples 1 to 5

Magnetic tape cartridges for computers of Comparative Examples 1 to 5 were constructed in the same manner as in Example 1, except that the slitting conditions were changed to the conditions indicated in Table 4. In these Comparative Examples, a conventional sucking section having sucking holes, but not the mesh sucking section, was used as the sucking section (51).

Examples 14 to 17

Magnetic tape cartridges for computers of Examples 14 to 17 were constructed in the same manner as in Example 1, except that the reels shown in Table 5 were used.

Examples 18 to 23 and Comparative Examples 6 to 13

Magnetic tape cartridges for computers of Examples 18 to 23 and Comparative Examples 6 to 13 were constructed in the same manner as in Example 1, except that the reels shown in Tables 6 to 8, and the magnetic tape of Example 3 were used. These magnetic tape cartridges were used for evaluating the damages of the edges of the tapes and the winding disorder of the tapes.

The characteristics of the magnetic tape cartridges were evaluated as follows.

<Amount of Edge Weave and Cycle thereof in the Lengthwise Direction of Tape>

The amount of a weave on the edge of a tape as the reference side for the tape running was continuously measured over a length of 50 m of the tape, with an edge weave meter (Keyence) mounted on the servo writer. The obtained amount of edge weave was subjected to Fourier analysis to find the amount of the edge weave and the cycle of the edge weave in the lengthwise direction of the tape.

<PES and Amount of Off-Track>

PES and the amount of off-track were determined from a fluctuation in reproduction output when signals are recorded (with a recording wavelength of 0.37 µm) and reproduced, using a modified LTO drive (the recording track width: 20.6 µm, and the reproducing track width: 12 µm).

<Evaluation of Damage of Edge of Magnetic Tape and Winding Disorder of Tape>

The damage of the edge of a tape and the winding disorder of the tape were evaluated using ten LTO drives. One hundred magnetic tape cartridges in which magnetic tapes were wound around specified reels were used for evaluation. Reference data were previously recorded on the data regions of the magnetic tape cartridges used for evaluation, and the data were reproduced to determine the amounts of off-track. Then, each of these cartridges was run forward and backward (reciprocated) at a rate of 4 m/sec., and this reciprocated running was repeated 1,000 times. The damage of the edge of each magnetic tape after subjected to the running test was evaluated by measuring the amount of off-track found after the running test. If this amount of off-track was increased by 50% or more of the amount of off-track which had been found before the running test, it was evaluated that such a magnetic tape was damaged at its edge. The winding disorder of the magnetic tape after the running test was evaluated by visually observing the condition of the winding of the magnetic tape from both sides of the reel to evaluate the degree of the winding disorder.

<Surface Roughness, Median of Unevenness and Projection Amount of Magnetic Layer>

The measurement was carried out by a scanning type white-light interference method with a scanning length of 5 µm using a general-purpose three-dimensional surface structure analyzer (New Veiw 5000 manufactured by ZYGO). The field of view was 350 µm×260 µm.

$(P_1-P_0)$, $(P_1-P_{20})$ and $[(P_1-P_0)/Ra]$ were calculated, wherein Ra is a centerline average surface roughness of the magnetic layer; $P_0$ is a central value of the unevenness of the magnetic layer; and $P_1$ is the maximum projection (the highest), and $P_2$, $P_3$, $P_4$, $P_5$ ... $P_{19}$, $P_{20}$ are the second highest, the third highest, the fourth highest, the fifth highest, ... the nineteenth highest, the twentieth highest in the magnetic layer, respectively.

<Coefficients of Dynamic Friction between the Magnetic Layer and Each of the Slider Material and SUS>

Against SUS:

Around a SUS pin (SUS 304) having an outer diameter of 5 mm, a magnetic tape was wound at an angle of 90 degrees under a load of 0.64 N. The same part of the tape was slid at a rate of 20 mm/sec. ten times, and then a coefficient of friction was measured.

Against Slider Material:

Around an AlTIC pin having an outer diameter of 7 mm, a magnetic tape was wound at an angle of 90 degrees under a load of 0.64 N. The same part of the tape was slid at a rate of 20 mm/sec. ten times, and then a coefficient of dynamic friction was measured.

The results are shown in Tables 1 to 4. The notations in the Tables mean the following.

$\mu_{mSL}$: a coefficient of dynamic friction between a magnetic layer and a slider material.

$\mu_{mSUS}$: a coefficient of dynamic friction between a magnetic layer and SUS.

$\mu_{BSUS}$: a coefficient of dynamic friction between a backcoat layer and SUS.

Brδ: a product of a residual magnetic flux density (Br) and a thickness of a magnetic layer (δ).

Hc: a coercive force of a magnetic layer.

Surface roughness Ra of a magnetic layer: a centerline average surface roughness Ra of a magnetic layer.

TABLE 1

| | |
|---|---|
| Thickness of magnetic layer (µm) | 0.15 |

TABLE 1-continued

| | |
|---|---|
| Brδ (μTm) | 0.045 |
| Hc (kA/m) | 155 |
| Thickness of primer coat layer (μm) | 1.8 |
| Non-magnetic support material/Thickness (μm) | PEN/6.2 |
| Thickness of backcoat layer (μm) | 0.5 |
| Total thickness (μm) | 8.65 |

TABLE 1-continued

| | |
|---|---|
| Surface roughness Ra of magnetic layer (nm) | 3.1 |
| $(P_1 - P_0)$ (nm) | 27.7 |
| $(P_1 - P_{20})$ (nm) | 3.0 |
| $\mu_{msus}$ | 0.20 |
| $[(\mu_{mSL})/(\mu_{mSUS})]$ | 1.1 |
| $[(\mu_{mSL})/(\mu_{BSUS})]$ | 1.2 |
| $[(P_1 - P_0)/Ra]$ | 8.9 |

TABLE 2

| | | Ex. 1 | Ex. 2 | Ex. 3 | Ex. 4 | Ex. 5 | Ex. 6 | Ex. 7 |
|---|---|---|---|---|---|---|---|---|
| Sucking portion | | Mesh | Mesh | Mesh | Mesh | Mesh | Mesh | Mesh |
| Sucking pressure (×10³ Pa) | | 13.3 | 13.3 | 13.3 | 13.3 | 13.3 | 13.3 | 13.3 |
| Winding angle | | 188° | 188° | 188° | 188° | 188° | 188° | 188° |
| Driving belt | | Flat belt | Flat belt | Flat belt | — | Flat belt | Flat belt | Flat belt |
| Coupling member | | Rubber | Rubber | Vibration proof rubber | — | Rubber | Vibration proof rubber | Vibration proof rubber |
| Direct drive | | — | — | — | Used | — | — | — |
| Slitting speed | (m/min.) | 200 | 200 | 200 | 200 | 300 | 300 | 400 |
| Cycle f | (mm) | 65 | 65 | 65 | 65 | 98 | 98 | 130 |
| Edge weave amount α | (μm) | 1.5 | 1.5 | 1.3 | 0.8 | 1.5 | 1.3 | 1.3 |
| Recording track width W | (μm) | 20.5 | 20.5 | 20.5 | 20.5 | 20.5 | 20.5 | 20.5 |
| Reproducing track width | (μm) | 12 | 12 | 12 | 12 | 12 | 12 | 12 |
| Tape-feeding speed V | (mm/sec.) | 4000 | 8000 | 4000 | 4000 | 4000 | 4000 | 4000 |
| α/W | | 0.073 | 0.073 | 0.063 | 0.039 | 0.073 | 0.063 | 0.063 |
| V/f | (s⁻¹) | 62 | 123 | 62 | 62 | 41 | 41 | 31 |
| (α/W) (V/f) | | 4.5 | 9.0 | 3.9 | 2.4 | 3.0 | 2.6 | 2.0 |
| α X (V/f) | (mm/sec.) | 92 | 185 | 80 | 49 | 61 | 53 | 40 |
| PES | (μm) | 0.15 | 0.30 | 0.13 | 0.08 | 0.10 | 0.09 | 0.07 |
| Off-track | (%) | 5.5 | 10.9 | 4.7 | 2.9 | 3.6 | 3.1 | 2.4 |

TABLE 3

| | | Ex. 8 | Ex. 9 | Ex. 10 | Ex. 11 | Ex. 12 | Ex. 13 |
|---|---|---|---|---|---|---|---|
| Sucking portion | | Mesh | Mesh | Mesh | Mesh | Mesh | Mesh |
| Sucking pressure (×10³ Pa) | | 13.3 | 13.3 | 13.3 | 13.3 | 13.3 | 13.3 |
| Winding angle | | 188° | 188° | 188° | 188° | 188° | 188° |
| Driving belt | | — | — | — | — | — | — |
| Coupling member | | — | — | — | — | — | — |
| Direct drive | | Used | Used | Used | Used | Used | Used |
| Slitting speed | (m/min.) | 200 | 300 | 400 | 400 | 400 | 400 |
| Cycle f | (mm) | 65 | 98 | 130 | 130 | 130 | 1300 |
| Edge weave amount α | (μm) | 0.8 | 0.8 | 0.8 | 0.8 | 0.8 | 0.8 |
| Recording track width W | (μm) | 20.5 | 20.5 | 20.5 | 20.5 | 20.5 | 20.5 |
| Reproducing track width | (μm) | 12 | 12 | 12 | 12 | 12 | 12 |
| Tape-feeding speed V | (mm/sec.) | 4000 | 4000 | 4000 | 6000 | 8000 | 10000 |
| α/W | | 0.039 | 0.039 | 0.039 | 0.039 | 0.039 | 0.039 |
| V/f | (s⁻¹) | 62 | 41 | 31 | 46 | 62 | 77 |
| (α/W) (V/f) | | 2.4 | 1.6 | 1.2 | 1.8 | 2.4 | 3.0 |
| α X (V/f) | (mm/sec.) | 49 | 33 | 25 | 37 | 49 | 62 |
| PES | (μm) | 0.08 | 0.05 | 0.04 | 0.06 | 0.08 | 0.10 |
| Off-track | (%) | 2.9 | 1.9 | 1.5 | 2.2 | 2.9 | 3.6 |

TABLE 4

| | C. Ex. 1 | C. Ex. 2 | C. Ex. 3 | C. Ex. 4 | C. Ex. 5 |
|---|---|---|---|---|---|
| Sucking portion | 13.5 mm pitch | 13.5 mm pitch | 13.5 mm pitch | 13.5 mm pitch | 13.5 mm pitch |
| Sucking pressure (×10³ Pa) | 1.33 | 1.33 | 1.33 | 1.33 | 1.33 |
| Winding angle | 188° | 188° | 188° | 188° | 188° |
| Driving belt | Timing belt | Flat belt | Timing belt | Timing belt | Timing belt |
| Coupling material | Rubber | Rubber | Metal | Metal | Metal |

TABLE 4-continued

|  |  | C. Ex. 1 | C. Ex. 2 | C. Ex. 3 | C. Ex. 4 | C. Ex. 5 |
|---|---|---|---|---|---|---|
| Direct drive |  | — | — | — | — | — |
| Slitting speed | (m/min.) | 200 | 200 | 200 | 200 | 200 |
| Cycle f | (mm) | 13.5 | 13.5 | 13.5 | 13.5 | 13.5 |
| Edge weave amount α | (μm) | 2.6 | 2.5 | 3 | 3 | 3 |
| Recording track width W | (μm) | 20.5 | 20.5 | 20.5 | 20.5 | 20.5 |
| Reproducing track width | (μm) | 12 | 12 | 12 | 12 | 12 |
| Tape-feeding speed V | (mm/sec.) | 4000 | 4000 | 4000 | 6000 | 8000 |
| α/W |  | 0.127 | 0.122 | 0.146 | 0.146 | 0.146 |
| V/f | (s$^{-1}$) | 296 | 296 | 296 | 444 | 593 |
| (α/W) (V/f) |  | 37.6 | 36.1 | 43.4 | 65.0 | 86.7 |
| α X (V/f) | (mm/sec.) | 770 | 741 | 889 | 1333 | 1778 |
| PES | (μm) | 0.50 | 0.45 | 0.55 | 1.2 | 1.7 |
| Off-track | (%) | 24 | 24 | 27 | 40 | 53 |

TABLE 5

|  | Ex. 14 | Ex. 15 | Ex. 16 | Ex. 17 |
|---|---|---|---|---|
| Taper of winding shaft | 0 | 0.03 | 0.01 | 0.1 |
| Distance S1 at inner side of winding shaft (mm) | 12.97 | 12.87 | 12.78 | 12.93 |
| Ratio of S1 to upper limit P of tape width (S1/P) | 1.025 | 1.017 | 1.01 | 1.022 |
| Distance S2 at outer side of winding shaft (mm) | 13.29 | 13.15 | 13.05 | 13.16 |
| Ratio of S2 to upper limit P of tape width (S2/P) | 1.05 | 1.039 | 1.031 | 1.04 |
| (S2/P) (S1/P) | 1.025 | 1.022 | 1.021 | 1.018 |
| PES (μm) | 0.2 | 0.13 | 0.15 | 0.16 |
| Off-track (%) | 11.0 | 2.1 | 5.5 | 5.8 |

TABLE 6

|  | Ex. 6 | Ex. 18 | Ex. 19 | C. Ex. 7 | C. Ex. 8 |
|---|---|---|---|---|---|
| Taper of winding shaft | 0 | 0.01 | 0.1 | 0.12 | 0.15 |
| Distance S1 at inner side of winding shaft (mm) | 12.87 | 12.87 | 12.87 | 12.87 | 12.87 |
| Ratio of S1 to upper limit P of tape width (S1/P) | 1.017 | 1.017 | 1.017 | 1.017 | 1.017 |
| Interval S2 at outer side of winding shaft (mm) | 13.15 | 13.15 | 13.15 | 13.15 | 13.15 |
| Ratio of S2 to upper limit P of tape width (S2/P) | 1.039 | 1.039 | 1.039 | 1.039 | 1.039 |
| (S2/P) (S1/P) | 1.022 | 1.022 | 1.022 | 1.022 | 1.022 |
| Damage of tape edge | A | A | A | B | C |
| Disorder in winding of tape | B | A | A | A | B |

Note:
Damage of the edge of the tape:
A: 1 or less out of 100 reels
B: 2 to less than 9 out of 100 reels
C: 10 or more out of 100 reels
Disorder in the winding of the tape:
A: 5 or less out of 100 reels
B: 6 to less than 15 out of 100 reels
C: 16 or more out of 100 reels

TABLE 7

|  | C. Ex. 9 | C. Ex. 10 | Ex. 20 | Ex. 21 | C. Ex. 11 |
|---|---|---|---|---|---|
| Taper of winding shaft | 0.03 | 0.03 | 0.03 | 0.03 | 0.03 |
| Interval S1 at inner side of winding shaft (mm) | 12.72 | 12.76 | 12.78 | 12.93 | 12.97 |
| Ratio of S1 to upper limit P of tape width (S1/P) | 1.005 | 1.008 | 1.010 | 1.022 | 1.025 |
| Interval S2 at outer side of winding shaft (mm) | 12.94 | 12.97 | 13.00 | 13.15 | 13.19 |
| Ratio of S2 to upper limit P of tape width (S2/P) | 1.022 | 1.025 | 1.027 | 1.039 | 1.042 |
| (S2/P) (S1/P) | 1.017 | 1.017 | 1.017 | 1.017 | 1.017 |
| Damage of tape edge | C | B | A | A | A |
| Disorder in winding of tape | A | A | A | A | B |

Note:
Damage of the edge of the tape:
A: 1 or less out of 100 reels
B: 2 to less than 9 out of 100 reels
C: 10 or more out of 100 reels
Disorder in the winding of the tape:
A: 5 or less out of 100 reels
B: 6 to less than 15 out of 100 reels
C: 16 or more out of 100 reels

TABLE 8

|  | C. Ex. 12 | Ex. 22 | Ex. 23 | C. Ex. 13 |
|---|---|---|---|---|
| Taper of winding shaft | 0.03 | 0.03 | 0.03 | 0.03 |
| Interval S1 at inner side of winding shaft (mm) | 12.78 | 12.78 | 12.78 | 12.78 |
| Ratio of S1 to upper limit P of tape width (S1/P) | 1.010 | 1.010 | 1.010 | 1.010 |
| Interval S2 at outer side of winding shaft (mm) | 12.78 | 12.91 | 13.17 | 13.31 |
| Ratio of S2 to upper limit P of tape width (S2/P) | 1.010 | 1.020 | 1.040 | 1.051 |
| (S2/P) (S1/P) | 1.000 | 1.010 | 1.030 | 1.041 |
| Damage of tape edge | C | A | A | A |
| Disorder in winding of tape | A | A | A | B |

Note:
Damage of the edge of the tape:
A: 1 or less out of 100 reels
B: 2 to less than 9 out of 100 reels
C: 10 or more out of 100 reels
Disorder in the winding of the tape:
A: 5 or less out of 100 reels
B: 6 to less than 15 out of 100 reels
C: 16 or more out of 100 reels As is understood from the above results, the magnetic tapes which satisfy the following conditions make it possible to decrease PES and the amount of off-track and thereby to provide excellent servo tracking performance. That is, each of such magnetic tapes is used at a running speed of 4 m/sec. or higher, and the magnetic tape comprises a non-magnetic support, at least one magnetic layer formed on one surface of the non-magnetic support, and a backcoat layer formed on the other side thereof, wherein servo signals for controlling tracking are recorded on the magnetic layer or the backcoat layer, and wherein the magnetic tape has recording tracks with a width of 21 μm or less, characterized in that the value of $(\alpha/W) \times (V/f)$ is 10 $[s^{-1}]$ or less, and the value of $(\alpha/W)$ is 0.1 or less, wherein V [mm/sec.] is a tape-running speed; $\alpha$ [μm] is an amount of edge weave with a cycle of f [mm] on one edge 3a or the other edge 3a' of the tape as the reference side for the running of the tape; and W [μm] is a width of the recording track.

Further, a magnetic tape cartridge including such a magnetic tape houses a reel which comprises a winding shaft and flange portions, characterized in that the outer circumferential surface of the winding shaft is tapered at a taper angle of 0.01 to 0.1 degrees so that one end face of the winding shaft on the side of one edge of the tape as the reference side for the running of the tape can have a larger diameter, and that the ratio of S1 to P is set within a range of $1.010 \leqq (S1/P) \leqq 1.022$, and the ratio of S2 to P, within a range of $(S1/P) < (S2/P) < 1.041$, wherein S1 [μm] is a distance between the inner surfaces of the flange portions which oppose to each other at a position just outside the winding shaft and on the inner circumference of the reel; S2 [μm] is a distance between the inner surfaces of the flange portions which oppose to each other at a position on the outer circumference of the reel; and P is an upper limit value of the width of the tape. This magnetic tape cartridge is far excellent in serve tracking performance, and the damage of the edge tape and the winding disorder of the tape are lessened.

EFFECT OF THE INVENTION

According to the present invention, a magnetic tape which decreases PES and off-track and thus is excellent in servo tracking performance, and a magnetic tape cartridge including such a magnetic tape are provided. The magnetic tape cartridge of the present invention has a larger capacity per reel, a smaller PW50 and a higher reproducing output, which results in a lower error rate. Thus, the magnetic tape cartridge of the present invention is suitably and highly reliably used, for example, as a backup tape for computers.

What is claimed:

1. A magnetic tape comprising a non-magnetic support, at least one recording layer formed on one surface of the non-magnetic support, and a backcoat layer formed on the other surface of the non-magnetic support, wherein servo signals for controlling tracking are recorded on the recording layer or the backcoat layer, and said magnetic tape has recording tracks with a width of 21 μm or less and an edge weave amount of 0.8 to 2.1 μm; and wherein a value of $(\alpha/W) \times (V/f)$ is 10 $(s^{-1})$ or less, wherein $\alpha$ (μm) is an amount of an edge weave with a cycle of f (mm) on a tape edge served as a reference side for running of the magnetic tape; V (mm/second) is a tape running speed; and W (μm) is a width of a recording track.

2. A magnetic tape cartridge comprising a box-shaped casing body and a reel around which the magnetic tape of claim 1 is wound.

3. The magnetic tape according to claim 1, wherein said cycle f is from 65 mm to 130 mm.

4. A magnetic tape comprising a non-magnetic support, at least one recording layer formed on one surface of the non-magnetic support, and a backcoat layer formed on the other surface of the non-magnetic support, wherein servo signals for controlling tracking are recorded on the recording layer or the backcoat layer, and said magnetic tape has an edge weave amount of 0.8 to 2.1 μm and upon recording has recording tracks with a width of 21 μm or less; and wherein a value of $(\alpha/W) \times (V/f)$ is 10 $(s^{-1})$ or less, wherein $\alpha$ (μm) is an amount of an edge weave with a cycle of f (mm) on a tape edge served as a reference side for running of the magnetic tape; V (mm/second) is a tape running speed; and W (μm) is a width of a recording track.

* * * * *